(12) United States Patent
Lin et al.

(10) Patent No.: US 11,616,390 B2
(45) Date of Patent: Mar. 28, 2023

(54) MICRO-GRID RECONSTRUCTION METHOD AND DEVICE, MICRO-GRID PROTECTION CONTROL CENTER, AND STORAGE MEDIUM

(71) Applicant: Tsinghua University, Beijing (CN)

(72) Inventors: Hengwei Lin, Beijing (CN); Kai Sun, Beijing (CN); Xi Xiao, Beijing (CN)

(73) Assignee: Tsinghua University, Beijing (CN)

( * ) Notice: Subject to any disclaimer, the term of this patent is extended or adjusted under 35 U.S.C. 154(b) by 58 days.

(21) Appl. No.: 17/254,244

(22) PCT Filed: Jun. 19, 2019

(86) PCT No.: PCT/CN2019/091951
§ 371 (c)(1),
(2) Date: Dec. 18, 2020

(87) PCT Pub. No.: WO2019/242657
PCT Pub. Date: Dec. 26, 2019

(65) Prior Publication Data
US 2021/0152018 A1    May 20, 2021

(30) Foreign Application Priority Data

Jun. 19, 2018  (CN) .......................... 201810631216.6
Jun. 19, 2018  (CN) .......................... 201810631529.1

(51) Int. Cl.
*H02J 13/00*   (2006.01)
*H02J 3/00*    (2006.01)
(Continued)

(52) U.S. Cl.
CPC .... *H02J 13/00002* (2020.01); *G05B 13/0265* (2013.01); *G05B 13/048* (2013.01); *H02J 3/0012* (2020.01)

(58) Field of Classification Search
CPC .... H02J 13/00002; H02J 3/0012; H02J 3/381; H02J 2300/24; H02J 2300/28;
(Continued)

(56) References Cited

U.S. PATENT DOCUMENTS

| 5,483,462 | A  | * | 1/1996 | Chiang ................... | H02J 3/242 |
| | | | | | 361/111 |
| 8,154,892 | B2 | * | 4/2012 | Kernahan ............... | H02J 3/381 |
| | | | | | 700/298 |

(Continued)

FOREIGN PATENT DOCUMENTS

| CN | 101630840 A | 1/2010 |
| CN | 101873007 A | 10/2010 |

(Continued)

OTHER PUBLICATIONS

X. Wang and X. Li, "Fault Recovery of Micro-Grid Based on Network Reconfiguration," 2012 Asia-Pacific Power and Energy Engineering Conference, 2012, pp. 1-4, doi: 10.1109/APPEEC.2012.6306918. (Year: 2012).*

(Continued)

*Primary Examiner* — Rocio Del Mar Perez-Velez
*Assistant Examiner* — Olvin Lopez Alvarez
(74) *Attorney, Agent, or Firm* — Wolf, Greenfield & Sacks, P.C.

(57) ABSTRACT

Provided in embodiments of the present invention are a micro-grid reconstruction method and device, a micro-grid protection and control center and a storage medium. The method includes: monitoring and acquiring current operating data of a micro-grid in real-time; storing the acquired current operating data and corresponding time stamp information in a database; analyzing an operating state of the micro-grid based on the operating data and the corresponding time stamp information that are stored in the database;

(Continued)

and determining a current control scheme for the micro-grid according to a current analysis result, and reconstructing the micro-grid according to the current control scheme. The technical solution mentioned above realizes flexible protection and control of the micro-grid and improves the operating automation and intelligence of a system.

18 Claims, 7 Drawing Sheets

(51) Int. Cl.
  *G05B 13/02* (2006.01)
  *G05B 13/04* (2006.01)
(58) Field of Classification Search
  CPC .... H02J 2310/10; H02J 4/00; G05B 13/0265; G05B 13/048; Y02E 10/56
  See application file for complete search history.

(56) References Cited

U.S. PATENT DOCUMENTS

| | | | | |
|---|---|---|---|---|
| 10,324,459 | B2* | 6/2019 | Lv | G05B 23/0262 |
| 10,998,756 | B2* | 5/2021 | Jin | H02J 3/00125 |
| 11,355,961 | B2* | 6/2022 | Duan | H02J 13/00002 |
| 2007/0150114 | A1* | 6/2007 | Gardner | H02J 3/08 700/286 |
| 2011/0106321 | A1* | 5/2011 | Cherian | H02J 13/00017 700/286 |
| 2013/0063272 | A1* | 3/2013 | Bhageria | H02J 13/0079 340/650 |
| 2013/0132001 | A1* | 5/2013 | Yacout | G01D 3/10 702/35 |
| 2015/0097699 | A1* | 4/2015 | Zubia Urrutia | H02J 13/00002 340/870.02 |
| 2016/0179118 | A1* | 6/2016 | Song | H02J 13/00034 700/295 |
| 2016/0370819 | A1* | 12/2016 | Forbes, Jr. | G06Q 50/06 |
| 2017/0090434 | A1* | 3/2017 | Katsuki | G05B 13/0265 |
| 2017/0237255 | A1* | 8/2017 | Inam | H02J 13/0079 700/295 |
| 2018/0316188 | A1* | 11/2018 | Ishchenko | H02J 3/38 |

FOREIGN PATENT DOCUMENTS

| | | | | |
|---|---|---|---|---|
| CN | 102355057 A | | 2/2012 | |
| CN | 102968111 A | | 3/2013 | |
| CN | 103560541 A | | 2/2014 | |
| CN | 103956716 A | | 7/2014 | |
| CN | 104578427 A | | 4/2015 | |
| CN | 105048457 A | | 11/2015 | |
| CN | 105226702 A | | 1/2016 | |
| CN | 205123282 U | | 3/2016 | |
| CN | 105846464 A | * | 8/2016 | ......... G06Q 10/0637 |
| CN | 106054672 A | | 10/2016 | |
| CN | 106324429 A | | 1/2017 | |
| CN | 106786774 | * | 5/2017 | ............... H02J 3/14 |
| CN | 106877338 A | | 6/2017 | |
| CN | 107862405 A | * | 3/2018 | ............. G06Q 10/04 |
| CN | 108649575 A | | 10/2018 | |
| CN | 108767987 A | | 11/2018 | |

OTHER PUBLICATIONS

International Search Report dated Sep. 23, 2019 in connection with International Application No. PCT/CN2019/091951.
Song, Wide Area Collaborative Control of Microgrid Group Based on MAS-SOA. China Academic Journal Electronic Publishing House. Jul. 10, 2011, No. 7, pp. 13-15.
Li et al., Development and application of Microgrid energy management system. East China Electric Power. May 2013;41(5):1071-4.
Li et al., Micro-grid Hierarchical Optimization Fault Reconstruction. Proceedings of the CSEE. Dec. 20, 2015;35(24):6378-84.
Li et al., Key Technologies of DC Microgrids: An Overview. Proceedings of the CSEE. Jan. 5, 2016;36(1):2-17.

* cited by examiner

MICRO-GRID RECONSTRUCTION METHOD AND DEVICE, MICRO-GRID PROTECTION CONTROL CENTER, AND STORAGE MEDIUM

CROSS-REFERENCE TO RELATED APPLICATIONS

This application is a 35 U.S.C. § 371 National Phase filing of International Application No. PCT/CN2019/091951, filed on Jun. 19, 2019, entitled "MICRO-GRID RECONSTRUCTION METHOD AND DEVICE, MICRO-GRID PROTECTION CONTROL CENTER, AND STORAGE MEDIUM," which claims priority to and the benefit of Chinese Patent Application No. 201810631529.1, filed on Jun. 19, 2018. PCT/CN2019/091951 also claims priority to and the benefit of Chinese Patent Application No. 201810631216.6, filed on Jun. 19, 2018. The entire contents of these applications are incorporated herein by reference in their entirety.

TECHNICAL FIELD

The present invention relates to the field of power control and in particular to a micro-grid reconstruction method and device, a micro-grid protection and control center, and a storage medium.

BACKGROUND

With the rapid development of power systems, there are more and more requirements for the comprehensive intelligent operation of traditional power systems. However, the performance of the grid protection control systems has been greatly improved, appearing in the wide-area grids.

Numbers of micro-grids are existing in the modern power system. Thus, there is an urgent need for the safe and efficient operation of the micro-grids themselves to realize flexible protection and control to further improve the automation and intelligence of the power system operation.

SUMMARY

In view of the above-mentioned problem, the present invention is proposed to provide a micro-grid reconstruction scheme that at least partially solves the above-mentioned problem.

According to one aspect of the present invention, a micro-grid reconstruction method is provided which includes:

monitoring and acquiring current operating data of a micro-grid in real-time;

storing the acquired current operating data and corresponding time stamp information in a database;

analyzing an operating state of the micro-grid based on the operating data and the corresponding time stamp information that are stored in the database; and determining a current control scheme for the micro-grid according to a current analysis result, and reconstructing the micro-grid according to the current control scheme.

Exemplarily, the analyzing the operating state of the micro-grid based on the operating data and the corresponding time stamp information that are stored in the database includes:

making a preliminary judgment whether the micro-grid is in abnormal state based on the current operating data;

in the case that the micro-grid is in abnormal state, retrieving operating data of relevant devices in a position where an abnormal event occurs from the current operating data and previous operating data, and performing accident analysis based on the retrieved operating data and corresponding time stamp information; and in the case that the micro-grid is in normal state, performing current-state analysis and future-state prediction based on the current operating data, the previous operating data and corresponding time stamp information;

the determining the current control scheme for the micro-grid according to the current analysis result includes:

determining the current control scheme according to an accident analysis result if the accident analysis result indicates that there is a true fault in the micro-grid; and determining the current control scheme according to a current-state analysis result and a future-state prediction result if the micro-grid is in normal state.

Exemplarily, the determining the current control scheme according to the accident analysis result includes:

determining a first optimization model according to the accident analysis result; and determining the current control scheme based on the accident analysis result by using the first optimization model;

the determining the current control scheme according to the current-state analysis result and the future-state prediction result includes:

determining a second optimization model according to the current-state analysis result and the future-state prediction result; and determining the current control scheme based on the current-state analysis result and the future-state prediction result by using the second optimization model.

Exemplarily, the micro-grid reconstruction method further includes:

if the accident analysis result indicates that there is no true fault in the micro-grid, determining whether a protection device in the micro-grid performs a mis-operation; and if the protection device in the micro-grid performs the mis-operation, controlling a breaker of the protection device to be closed.

Exemplarily, the micro-grid reconstruction method further includes: sending warning information if the accident analysis result indicates that there is a true fault in the micro-grid.

Exemplarily, the micro-grid includes power generation equipment, a power electronic converter(s), a controllable load(s) and/or a protection device(s), the determining the current control scheme for the micro-grid according to the current analysis result and the reconstructing the micro-grid according to the current control scheme include:

determining operating states and operating parameters of the power generation equipment, the power electronic converter(s) and/or the controllable load(s) according to the current analysis result, and controlling the power generation equipment, the power electronic converter(s) and/or the controllable load(s) to correspondingly change their operating states and/or the operating parameters according to the operating states and/or the operating parameters of the power generation equipment, the power electronic converter(s) and/or the controllable load(s); and/or determining a switching state of the protection device(s) according to the operating states and the operating parameters of the power generation equipment, the power electronic converter(s) and/or the controllable load(s), and controlling the protection device(s) to perform a corresponding switching operation(s) according to the switching state of the protection device(s) so as to change a topological structure of the micro-grid.

Exemplarily, the determining the switching state of the protection device(s) according to the operating states and the operating parameters of the power generation equipment, the power electronic converter(s) and/or the controllable load(s) includes:

retrieving a state decision table of the protection device(s) of the micro-grid based on the operating states and the operating parameters of the power generation equipment, the power electronic convene and/or the controllable load(s); and determining the switching state of the protection device(s) according to the retrieved result.

Exemplarily, the determining the current control scheme for the micro-grid according to the current analysis result includes:

determining the current control scheme for the micro-grid based on constraint conditions of the micro-grid by minimizing an objective function of a total system operating cost of the micro-grid, wherein the total system operating cost is equal to a sum of a system commissioning cost and a system scheduling cost that are computed according to the current analysis result.

Exemplarily, the determining the current control scheme for the micro-grid according to the current analysis result includes: determining the current control scheme for the micro-grid according to the current analysis result by using an artificial intelligence model.

Exemplarily, the micro-grid reconstruction method further includes:

storing the current analysis result and corresponding time stamp information in the database;

storing the current control scheme and corresponding time stamp information in the database; and training the artificial intelligence model based on the time stamp information, a previous analysis result and a previous control scheme that are stored in the database.

According to another aspect of the present invention, a micro-grid reconstruction device is provided and includes:

a data acquisition unit, configured to monitor and acquire current operating data of a micro-grid in real-time, and to store the acquired current operating data and corresponding time stamp information in a database;

a state analysis unit, configured to analyze an operating state of the micro-grid based on the operating data and the corresponding time stamp information that are stored in the database; and an optimization and decision-making unit; configured to determine a current control scheme for the micro-grid according to a current analysis result, and to reconstruct the micro-grid according to the current control scheme.

According to yet another aspect of the present invention, a micro-grid protection and control center is further provided and includes a processor and a memory. The memory stores a computer program instruction, and the computer program instruction, when executed by the processor, is used to perform the above micro-grid reconstruction method.

According to still another aspect of the present invention, a storage medium is further provided. A program instruction is stored in the storage medium, and when executed, is used to perform the above micro-grid reconstruction method.

According to the technical solutions of the present invention, the operation of the micro-grid system is optimized and the reliability of power supply of the micro-grid is improved. By reconstructing and operating the entire micro-grid flexibly and automatically, the intelligence, safety and economy of the operation in the micro-grid are improved.

The followings will describe the present invention in detail with reference to the accompanying drawings and specific embodiments, but are not intended to limit the present invention.

BRIEF DESCRIPTION OF DRAWINGS

The following drawings, which are used to provide a further understanding of embodiments of the present invention and to constitute part of this description, together with the embodiments of invention, serve to explain the principles of the present invention but are not intended to limit the present invention. The same reference signs in the drawings usually represent the same parts or steps.

DESCRIPTION OF EMBODIMENTS

In order to make objectives, technical solutions and advantages of the present invention more apparent, exemplary embodiments of the present invention will be described in detail below with reference to the accompanying drawings. It is obvious that the described embodiments are merely some rather than all of the embodiments of the present invention. It should be understood that the present invention is not limited by the exemplary embodiments described herein. Based on the embodiments described in the present invention, all other embodiments obtained by those skilled in the art without any creative efforts should fall within the scope of protection of the present invention.

According to an embodiment of the present invention, a control method for active intelligent reconstructing a micro-grid is provided. The micro-grid is a small power generation and distribution system, and it may include various primary and/or secondary devices such as power generation equipment, an energy storage device, a protection device, a compensation device, a load and a power electronic converter and so on. The primary devices refer to all devices directly associated with power generation, transmission and distribution functions, such as power generation equipment, a circuit breaker, a current/voltage transformer, a transformer, a lightning arrester and a disconnector, etc. The secondary devices refer to devices relevant to protection and control, such as a protective relay, a communication device, a control switch, an indicator light and a measuring instrument, etc By this micro-grid reconstruction method, working modes and/or operating states of the primary and/or secondary devices in the micro-grid may be adjusted to reconstruct the micro-grid.

Figure 1:
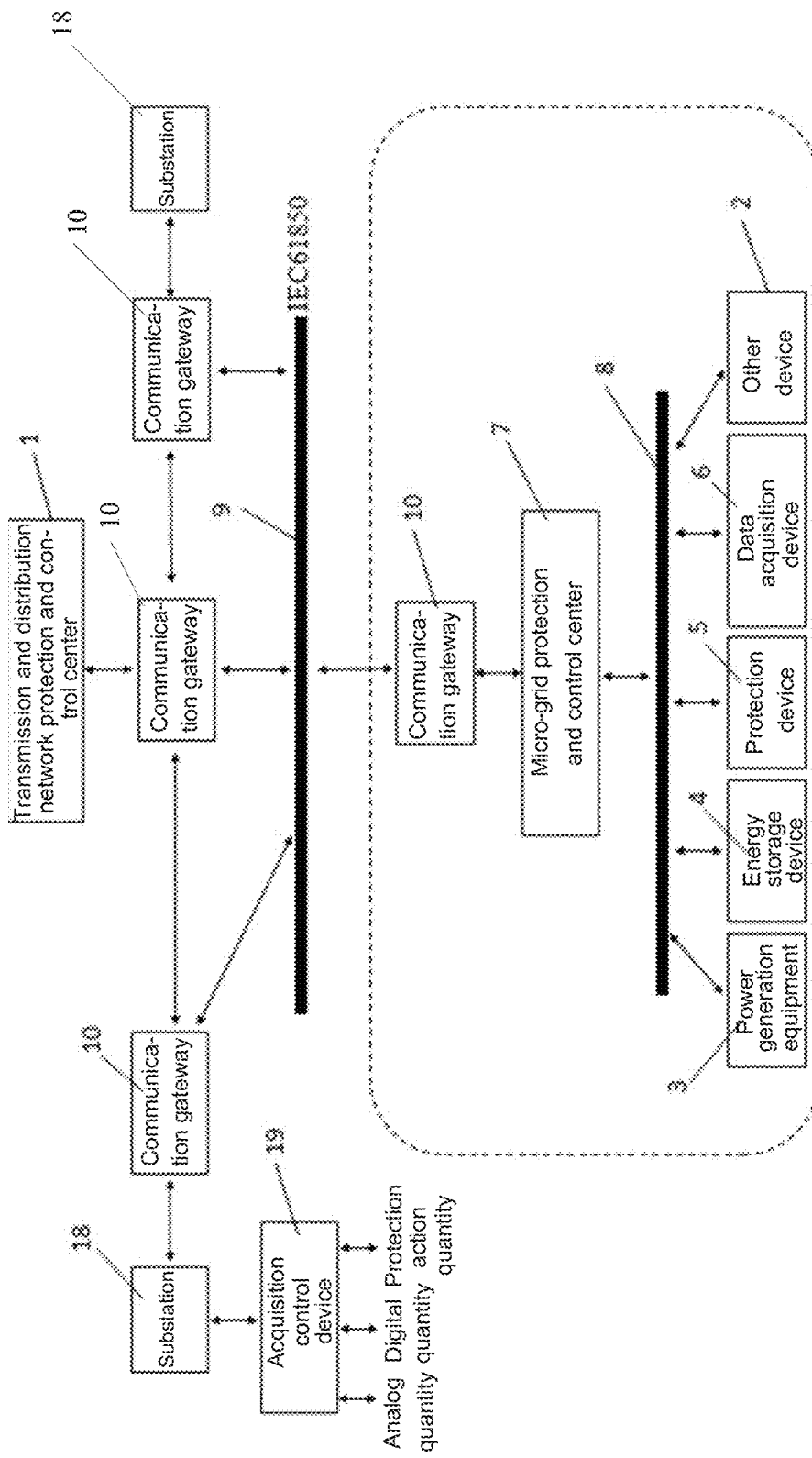
FIG. 1 illustrates a schematic diagram of a distribution network in accordance with one embodiment of the present invention.

In order to explain the embodiments of the present invention more clearly, FIG. 1 illustrates a schematic diagram of a distribution network in accordance with one embodiment of the present invention. The distribution network includes at least one micro-grid. The micro-grid is shown in the part of dotted box of FIG. 1.

Referring to FIG. 1, the micro-grid includes power generation equipment 3, an energy storage device 4, a protection device 5, a data acquisition device 6, and other devices 2 such as a reactive power compensation device. The power generation equipment 3 may be any device capable of providing electrical energy, such as photovoltaic power generation equipment, wind power generation equipment and other new energy power generation equipment. The energy storage device 4 may be, for example, an energy storage battery. The protection device 5 may be a power protection device such as a relay protection device. It can be understood that the protection device 5 may be connected to at least one other device. The safety of the connected device(s) may be ensured by a switching operation of the protection device 5. The data acquisition device 6 may also be connected to at least one other device, and may be configured to acquire data such as analog quantity, digital quantity, and protection action quantity of the downstream devices. The micro-grid may also include a micro-grid protection and control center 7. Any electrical equipment including the aforementioned power generation equipment 3, the energy storage device 4, the protection device 5, the data acquisition device 6, and the other devices 2 is connected to the micro-grid protection and control center 7 via a micro-grid communication network 8. The micro-grid protection and control center 7 is configured to protect and control the micro-grid by controlling the various devices in the micro-grid.

In addition to the above-mentioned micro-grid, the distribution network may also include devices such as substations 18, an acquisition control device 19, communication gateways 10, and a transmission and distribution network protection and control center 1 and so on. The transmission and distribution network protection and control center 1 is configured to operate the various devices in the distribution network as required to protect and control the distribution network. The substations 18 in the distribution network communicate with the transmission and distribution network protection and control center 1 via the communication gateways 10. The various analog, digital, and protection action quantities of the distribution network acquired by the acquisition control device 19 are uploaded to the transmission and distribution network protection and control center 1 via the substation 18, and protection and control of the distribution network are completed under the control of the transmission and distribution network protection and control center 1.

The micro-grid protection and control center 7 may be connected to a communication network 9 of the distribution network via the communication gateways 10. The communication network 9 of the distribution network is connected to the transmission and distribution network protection and control center 1 of the distribution network and the transmission network via the communication gateways 10. Therefore, the transmission and distribution network protection and control center 1 may perform real-time information interaction with the micro-grid protection and control center 7 via the communication gateways 10 and the communication network 9 of the distribution network, and control the micro-grid protection and control center 7 to protect and control the micro-grid accordingly. In other words, the micro-grid protection and control center 7 may be scheduled by the transmission and distribution network protection and control center 1 in a centralized manner.

In one example, the micro-grid protection and control center 7 may be compatible with the IEC61850 communication protocol by signal transformation of the communication gateways 10, and the micro-grid protection and control center 7 may externally communicate with the communication network 9 of the distribution network in a GOOSE manner.

The micro-grid protection and control center 7 may also control operation of the entire micro-grid based on a predetermined optimized protection control strategy. The optimized protection control strategy includes, such as, a power flow optimization strategy, a network topology adjustment strategy, a switching strategy of load and power generation equipment, a set value updating strategy of the protection devices, etc.

The micro-grid communication network 8 and the communication network 9 of the distribution network comprise, but are not limited to, wired communication networks such as an optical fiber communication network, various wireless communication networks, etc. The communication gateways 10 may realize interconnection between the micro-grid and the distribution network, which may be realized by any conventional or future-developed related technology. Optionally, the communication gateways 10 are compatible with the IEC61850 communication protocol of the grid and support the GOOSE communication.

As mentioned above, the micro-grid protection and control center 7 may be configured to perform automatic power control on operation of the micro-grid. Automatic reconstruction of the micro-grid may be realized by the micro-grid protection and control center 7. Alternatively, since the micro-grid protection and control center 7 is connected to the transmission and distribution network protection and control center 1 and scheduled and controlled by it, automatic power control may also be performed on the operation of the micro-grid by the transmission and distribution network protection and control center 1.

Figure 2:
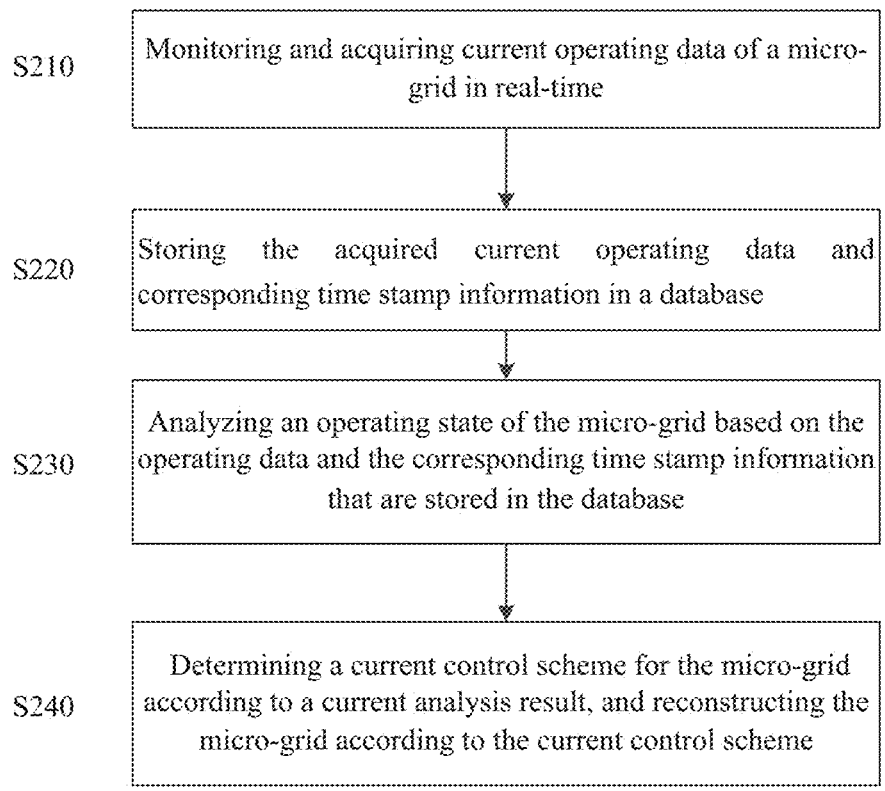
FIG. 2 illustrates a schematic flow diagram of a micro-grid reconstruction method in accordance with one embodiment of the present invention.

FIG. 2 illustrates a schematic flow diagram of a micro-grid reconstruction method 200 in accordance with one embodiment of the present invention. As shown in FIG. 2, the micro-grid reconstruction method 200 includes the following steps.

In step S210, current operating data of a micro-grid is monitored and acquired in real-time.

As mentioned above, the micro-grid may include various primary and/or secondary devices. The current operating data of various devices in the micro-grid may be monitored and acquired in real-time. For example, power flow distribution in the micro-grid may be monitored, and output voltage, output current, and output power, etc. of power generation equipment, an energy storage state, input/output voltage, input/output current, and input/output power, etc. of an energy storage device, a switching action state of a relay protection device, device/line parameter information in the micro-grid, such as voltage, current, power angle, frequency, heat productivity and so on, and parameters of a compensation device, such as voltage, current, compensation power and harmonic suppression may be monitored and acquired.

Specifically, taking the micro-grid shown in FIG. 1 as an example, output power of the power generation equipment 3, energy storage of the energy storage device 4, a switching value for indicating a switching state of the protection device 5, and voltage, current, temperature, etc. of a load of a communication device may be acquired.

It can be understood that the data may be acquired at a certain frequency. For example, the data acquisition frequency can be controlled in the minute (min) or second (s) level to reduce computation and communication burden caused by data acquisition and processing. For the electrical devices such as the power generation equipment, the power electronic converter, the energy storage device and a relay in the micro-grid, the data acquisition and processing frequency may be set higher, such as milliseconds (ms) level or above, to maintain their own normal operations. The above-mentioned data acquisition frequency may be different according to actual system operation differences, which is not limited exactly here.

In step S220, the acquired current operating data and corresponding time stamp information are stored in a database. The time stamp information of the operating data includes information about exact time at which the operating data is acquired. In the entire process of automatically controlling reconstruction of the micro-grid, the acquired operating data and its corresponding time stamp information may be stored in the database. Historical data of the micro-grid, stored in the database, helps to analyze the operating state of the micro-grid, and brings convenience for users to consult files, thereby improving the user experience and the system operation efficiency.

In step S230, an operating state of the micro-grid is analyzed based on the operating data and the corresponding time stamp information stored in the database.

Exemplarily, step S230 may include estimating a current-state of the micro-grid based on the current operating data. A preliminary judgment whether the micro-grid is in abnormal state is made based on the current operating data. It may be understandable that the state of the micro-grid is roughly estimated herein, and its estimation result may be inaccurate. For example, it is possible that a fluctuation of the micro-grid is merely caused by noise interference rather than a true fault.

Exemplarily, step S230 may also include performing accident analysis on the micro-grid based on the operating data and the corresponding time stamp information that are stored in the database. The accident analysis is aimed to determine whether there is a true fault in the micro-grid. Optionally, the accident analysis may be implemented by using a decision tree.

Exemplarily, step S230 may also include performing current-state analysis and future-state prediction on the micro-grid based on the operating data and the corresponding time stamp information that are stored in the database. Optionally, the current-state analysis and the future-state prediction may be performed by using an Artificial Neural Network (ANN). The ANN may be obtained by training. The current-state analysis is aimed to accurately determine the current operating state of the micro-grid. The future-state prediction is aimed to predict a future operating state of the micro-grid.

In step S240, a current control scheme for the micro-grid is determined according to a current analysis result, and the micro-grid is reconstructed according to the current control scheme. The current analysis result may include accident information, current operating state information and/or future operating state information, etc. of the micro-grid. According to different analysis results, the corresponding control scheme for the micro-grid may be determined, and the micro-grid may be automatically reconstructed according to the determined control scheme.

For example, according to the current analysis result, a connection structure among the electrical devices in the micro-grid and/or operating modes of the electrical devices may be adjusted accordingly in this step. Corresponding adjustment instructions are generated and issued to the electrical devices via the communication network in the micro-grid so as to reconstruct the micro-grid.

Specifically, for example, if the current analysis result indicates that a short-circuit fault may occur in part of the micro-grid, the switching state of the protection device, in the micro-grid, connected to the part may be changed. Thus, a partial device in which there is the short-circuit fault may be disconnected from the micro-grid. Optionally, the part may also be connected to other lines or nodes via a breaker of the protection device. Therefore, a network topological structure of the micro-grid is changed, and other devices in the micro-grid are protected.

Compared with the distribution network, the micro-grid is provided with the clearer and more completely matched power generation equipment, the energy storage device, and the load, which ensures successful implementation of the above technical solution. The above-mentioned micro-grid reconstruction method 200 may be adopted to reconstruct the micro-grid based on the operating data of the micro-grid, ensuring safer and more efficient operation of the micro-grid.

Figure 3:
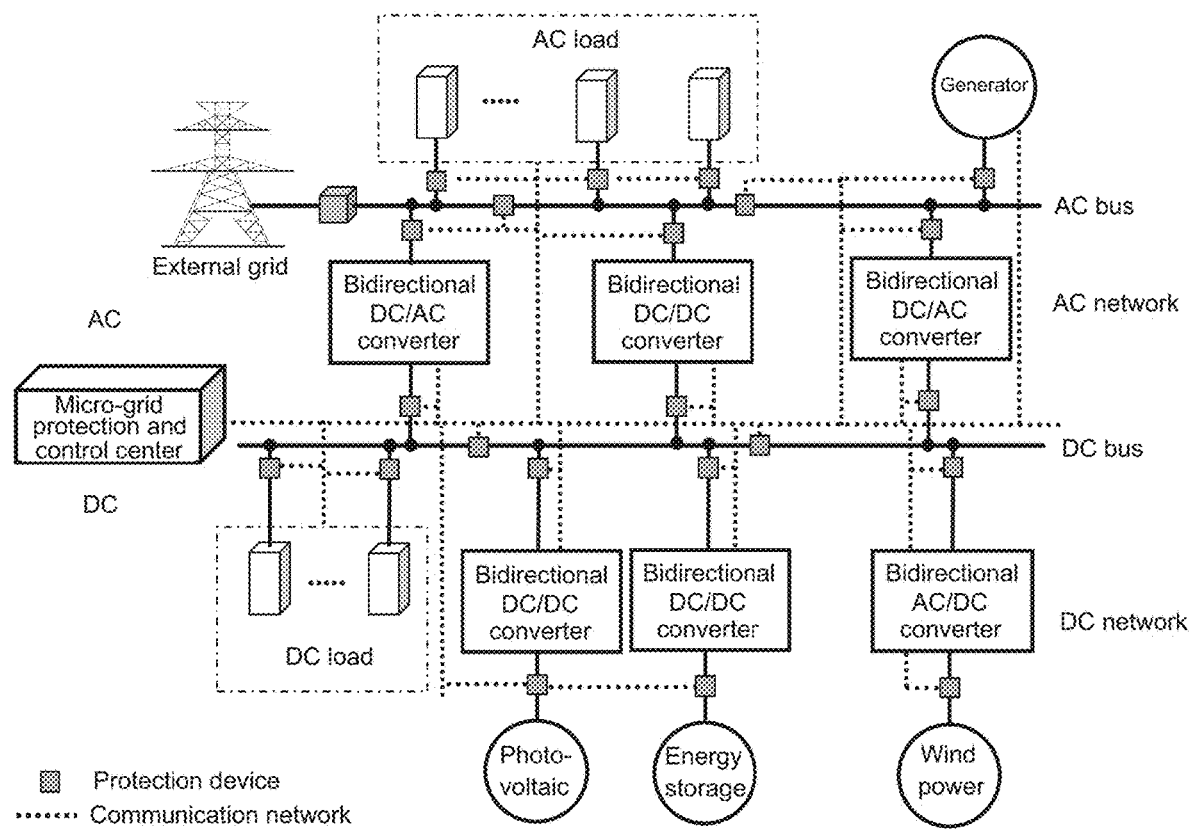
FIG. 3 illustrates a schematic diagram of an AC/DC hybrid grid in accordance with one embodiment of the present invention.

The above-mentioned micro-grid may be an AC grid, a DC grid, or an AC/DC hybrid grid. The AC/DC hybrid grid has both an AC grid and a DC grid. FIG. 3 illustrates an AC/DC hybrid grid in accordance with one embodiment of the present invention. As shown in FIG. 3, the AC/DC hybrid grid includes an AC network at the top of FIG. 3, a DC network at the bottom of FIG. 3, and a communication network shown in dashed lines. The AC/DC hybrid grid includes a micro-grid protection and control center. The micro-grid protection and control center is connected to the AC network and the DC network via the communication network, and the AC/DC hybrid grid is reconstructed based on the current operating data acquired from the AC network and/or the DC network.

It should be understood that the micro-grid may include a DC bus and a DC network, an AC bus and an AC network, and have the function of bidirectional energy flow of an AC/DC hybrid system. Based on this, the above-mentioned micro-grid may be transformed, extended and expanded. For example, the DC system and/or the AC system may be transformed, expanded, and extended to create a new DC or AC bus, a new circuit network structure, and a new connection manner.

Optionally, the micro-grid reconstruction method 200 further includes: storing state data and operating data of the micro-grid, such as the current analysis result, the executed current control scheme, and/or the time stamp information respectively corresponding to the aforementioned two items, in the database.

The time stamp information of the analysis result includes information about time at which the analysis result is acquired. The time stamp information of the control scheme includes information about time at which the control scheme is determined. In one embodiment, steps S230 and S240 are performed once every specific time period. According to the time period, the corresponding relationship among the operating data, the analysis result and the control scheme may be determined. Specifically, for any analysis result, the operating data corresponding to the analysis result may be determined according to the time stamp information of the operating data and the analysis result, as well as the performance period of step S230. For any control scheme, the analysis result corresponding to the control scheme may be determined according to the time stamp information of the analysis result and the performance time of step S240, and further, the operating data corresponding to the control scheme may be determined.

A large amount of state data and operating data of the micro-grid are stored in the database, which brings convenience for users to consult files later and to make or adjust control strategies. Thus, the user experience and the system operation efficiency are improved.

Figure 4:
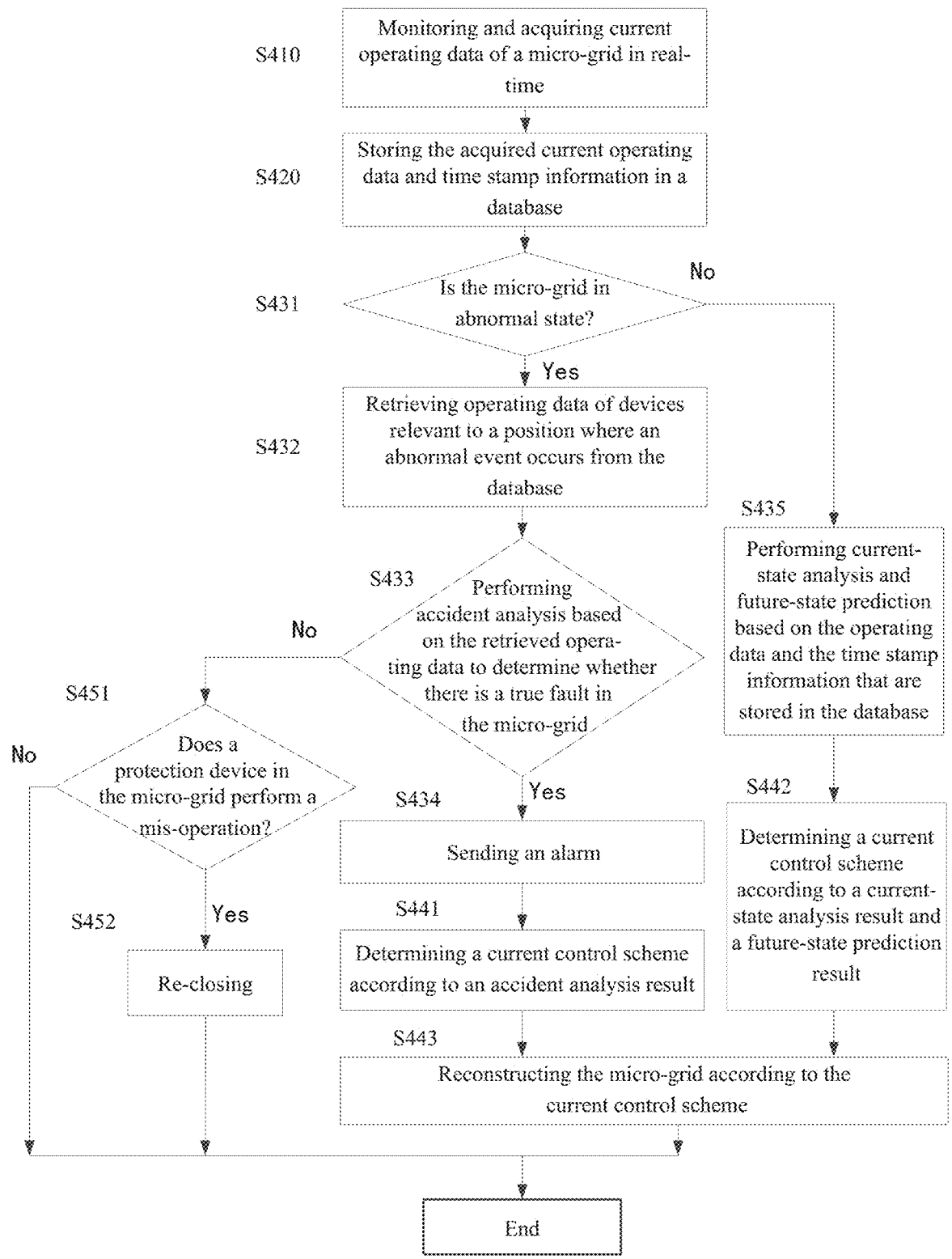
FIG. 4 illustrates a schematic flow diagram of a micro-grid reconstruction method in accordance with another embodiment of the present invention.

FIG. 4 illustrates a schematic flow diagram of a micro-grid reconstruction method 400 in accordance with another embodiment of the present invention. Steps S410 and S420 in the micro-grid reconstruction method 400 are similar to steps S210 and S220 in the micro-grid reconstruction method 200, and thus, will not be described in detail herein for brevity.

The micro-grid reconstruction method 400 specifically includes the following steps.

In step S431, a preliminary judgment whether a micro-grid is in abnormal state is made according to current operating data. For example, the preliminary judgment whether the micro-grid is in abnormal state may be made according to the fact that whether the current operating data acquired in real-time exceeds a normal limited range. For example, the preliminary judgment whether the micro-grid is in abnormal state may be made according to fault information reported by a protection device, such as a relay protection device. It can be understood that in step S431, an operating state of the micro-grid is merely judged preliminarily. The preliminary judgment result may be incorrect. For example, in some cases, there may be a signal fluctuation in the micro-grid. This signal fluctuation may be caused by a transient disturbance, and thus, the micro-grid may gradually return to its normal state even if no operation is performed. However, the micro-grid may be preliminarily judged as abnormal due to this signal fluctuation.

In this embodiment, in the case that the micro-grid is in abnormal state, step S432 is performed; and in the case that the micro-grid is normal, step S435 is performed.

In step S432, operating data of devices relevant to a position where an abnormal event occurs is retrieved from the operating data stored in the database. For example, the devices relevant to the position where the abnormal event occurs may be identified by the range, which is surrounded the position where the abnormal event occurs by specific quantity of devices or a specific distance. In this step, the current operating data and previous operating data of the relevant devices may be retrieved in the database to provide complete information about the abnormal event.

In step S433, accident analysis is performed based on the retrieved operating data and corresponding time stamp information to determine whether there is a true fault in the micro-grid. As mentioned above, the preliminary judgment result from step S431 may be incorrect. In this step S433, a more comprehensive analysis may be made on the abnormal event based on the retrieved data relevant to the occurrence of the abnormal event, so as to draw an exact conclusion whether there is a true fault in the micro-grid. It can be understood that the accident analysis may be performed by using a decision tree. The decision tree is a mathematical model established based on a tree structure. After assigning an evaluation and judgment function of the accident analysis for each leaf node of the decision tree and storing it, a search operation is performed on the decision tree and a final result of the accident analysis is determined in this step.

Optionally, if it is determined in step S433 that there is a fault in the micro-grid indeed, i.e., the accident analysis result of step S433 indicates that there is a true fault in the micro-grid; step S434 and step S441 may be performed.

In step S434, if the accident analysis result indicates that there is a true fault in the micro-grid, warning information is sent. The warning information may be sent by means of sound, images, and/or by warning devices such as a warning light. Thus, staff may be notified to deal with it in time so as to prevent the accident from causing greater losses. It can be understood that step S434 does not necessarily exist.

In step S441, a current control scheme may be determined according to the accident analysis result. In this step, the control scheme may be determined by using an optimization model. It can be understood that there may be one or more optimization models according to requirements of different micro-grids.

In one example, a plurality of optimization models is provided for determining the current control scheme according to the accident analysis result. A decision tree or a decision table specifying which optimization model to be adopted depending on given accident analysis result may be established. Table 1 illustrates a decision table according to one embodiment of the present invention.

TABLE 1

| Decision Table | | | | |
|---|---|---|---|---|
| Accident analysis result | Result 1 | Result 2 | . . . | Result n |
| Optimization model | Model 1 | Model 2 | . . . | Model n |

In step S441, first, a first optimization model is determined according to the accident analysis result. The optimization model may take the shortest power restoration time or the lowest restoration cost as an optimization objective as required. Then, the current control scheme is determined based on the accident analysis result by using the first optimization model. The accident analysis result is input into the first optimization model as an input variable, so that the first optimization model may output all components of the current control scheme.

In one example, the first optimization model may be based on an ANN model and a Monte Carlo tree search (MCTS) model. The MCTS model may be utilized to search a tree structure. The ANN may be used for setting up evaluation functions at nodes and leaves of the tree structure. The searched target is evaluated according to the accident analysis result by using the ANN model, to determine an optimal control scheme to be the current control scheme. While ensuring that the searched target is the currently optimal control scheme, the search time is shortened and the model computing efficiency is improved.

In step S443, the micro-grid is reconstructed according to the current control scheme determined in step S441. A corresponding instruction may be generated according to the control scheme. The generated instruction is issued to various devices in the micro-grid to change an operating state and/or a connection manner of the devices in the micro-grid.

Optionally, if it is determined in step S433 that there is no fault in the micro-grid, i.e., the accident analysis result of step S433 indicates that there is no fault in the micro-grid; steps S451 and S452 may be performed.

In step S451, if the accident analysis result indicates that there is no fault in the micro-grid, whether a protection device in the micro-grid performs a mis-operation is determined. In step S452, in the case that the protection device in the micro-grid performs the mis-operation, a breaker of the protection device is controlled to be closed.

In above-mentioned step S431, it is preliminarily judged that the micro-grid is in abnormal state. This abnormal event may cause the protection device in the micro-grid to perform a mis-operation. For example, the breaker in the protection device is false tripped. In step S451, it is determined whether the protection device in the micro-grid performs a mis-operation due to the abnormal event preliminarily judged in step S431. In above-mentioned step S433, it is determined that there is no true fault in the micro-grid. Therefore, in step S452, the breaker of the protection device performing the mis-operation is controlled to be reclosed, such that the micro-grid continues to work normally. It can be understood that if it is determined in step S451 that the protection device in the micro-grid does not perform a mis-operation, the micro-grid reconstruction may be directly ended.

As mentioned above, if it is determined in step S431 that the micro-grid is in normal state. Step S435 is performed. In step S435, current-state analysis and future-state prediction are performed based on the operating data and the corresponding time stamp information that are stored in the database. It can be understood that the operating data stored in the database includes current operating data and previous operating data, and the database may also store a mathematical model for the current-state analysis and a mathematical model for the future-state prediction. Optionally, the mathematical model for the current-state analysis may be implemented by the ANN. The mathematical model for the future-state prediction may be implemented by a Long Short-Term Memory (LSTM) optimization model. The LSTM model may store and output information by using memory cells, thereby ensuring the accuracy of prediction and guaranteeing the rationality of reconstruction. Based on these operating data, the mathematical model for the current-state analysis and/or the mathematical model for the future-state prediction may be selected to analysis the current operating state of the micro-grid in detail and to reasonably predict the future operating state of the micro-grid.

In step S442, the current control scheme is determined according to a current-state analysis result and a future-state prediction result. In one example, the active component, the reactive component and the harmonic component of a load in the micro-grid, and new energy supply of the power generation equipment in the micro-grid, may be perceived and predicted.

In this step, the control scheme may also be determined by using an optimization model. It can be understood that there may be one or more optimization models according to requirements of different micro-grids. Optionally, the optimization model may be based on the ANN model and the MCTS model. The MCTS model may be utilized to search a tree structure. The ANN model may be utilized to evaluate the searched target according to the current-state analysis result. While ensuring that the searched target is the currently optimal control scheme, the search time is shortened and the model computing efficiency is improved.

In one example, a plurality of optimization models is provided for determining the current control scheme according to the current-state analysis result and the future-state prediction result. In step S442, first, a second optimization model is determined according to the current-state analysis result and the future-state prediction result. The optimization model may take optimal power flow or the lowest operating cost as an optimization objective as required. Then, the current control scheme is determined based on the current-state analysis result and the future-state prediction result by using the second optimization model. The current-state analysis result and the future-state prediction result are input into the second optimization model as input variables, so that the second optimization model may output all components of the current control scheme.

Similar to step S441, step S442 is also followed by step S443. Step S443 has been described above, and thus will not be repeated herein for brevity.

Those of ordinary skill in the art can understand that the micro-grid reconstruction method 400 shown in FIG. 4 is merely an example but not intended to limit the present invention. For example, step S451 or S452 may not exist. In some micro-grids, the protection device itself is highly reliable and is not prone to a mis-operation. In this case, these two steps may not exist. For example, step S434 may not exist as described above. Step S434 may also be performed simultaneously with step S441 or after step S441.

In the above-mentioned micro-grid reconfiguration method 400, operating state analysis is performed separately for a fault state and a normal operating state of the micro-grid, and then, an optimal scheme for reconstruction operation of the micro-grid is determined based on the analysis result. Therefore, electrical connection and an operation mode of the micro-grid may be adjusted according to the optimal scheme, such that the micro-grid may be reconstructed actively and intelligently under both fault and non-fault conditions. Thus, economic operation of the micro-grid is optimized and the reliability in power supply is improved. The system configuration and the network structure may be actively adjusted in both fault and non-fault states of the system to improve the power supply reliability and the operating efficiency of the system. The above-mentioned intelligent reconstruction scheme is also high in flexibility, plasticity and safety.

The micro-grid reconstruction methods 200 and 400 include the step for determining the current control scheme for the micro-grid according to the current analysis result, for example, step S240 in the micro-grid reconstruction method 200, and steps S441 and S442 in the micro-grid reconstruction method 400. The specific implementation of determining the current control scheme for the micro-grid according to the current analysis result in accordance with one embodiment of the present invention will be described in detail below. In this embodiment, the total system operating cost of the micro-grid is used as an optimized objective function, which is desired to be minimum. The current control scheme for the micro-grid is determined based on constraint conditions of the micro-grid. The total system operating cost is equal to the sum of a system commissioning cost and a system scheduling cost that are computed according to the current analysis result.

The minimum operating cost of the micro-grid may be taken as an optimization objective, i.e., the total system operating cost of the micro-grid may be used as the objective function, which is desired to be minimum. The total system operating cost of the micro-grid may be represented by the sum of the system commissioning cost and the system scheduling cost, as shown in the following formula:

$$C(X,Y)=f(X)+g(Y); \text{ in which } X=[X_g, X_r, X_{es}] \text{ and } Y=[P_g, P_r, P_{es}, P_y, P_{ex}].$$

C(X,Y) represents the objective function, $f(X)$ represents the system commissioning cost and it is a function of an integer variable X, and g(Y) represents the system scheduling cost and it is a function of a continuous variable Y. The integer variable X represents a device state commissioning capacity in the micro-grid. The device state commissioning capacity X includes an operating mode $X_g$ of main power generation equipment, an operating mode $X_r$ of backup power generation equipment, and an operating mode $X_{es}$ of energy storage devices. The main power generation equipment may be a generator of any form, such as a wind generator and a permanent magnet synchronous generator, and its working mode only includes a power generating mode. Operating modes of the main power generation equipment may include a power generating mode and an out-of-service mode. The backup power generation equipment may be a device that may be in other working modes in addition to the power generating mode, e.g., a power electronic converter. The power electronic converter may be in various different working modes, such as a power generating mode and an active power filtering (APF) mode. Certainly, the power electronic converter may also be in a shutdown mode. The working modes of the energy storage devices may include a charging mode and a discharging mode. The continuous variable Y represents a device scheduling capacity of the micro-grid, and may include the power generating capacity $P_g$ of the main power generation equipment, the power generating capacity $P_r$ of the backup power generation equipment, the charging/discharging capacity $P_{es}$ of the energy storage devices, power consumption $P_y$ of controllable loads, and the energy exchange capacity $P_{ex}$, with an external grid. In this example, the power generating capacity $P_g$ of the main power generation equipment, the power generating capacity $P_r$ of the backup power generation equipment, the charging/discharging capacity $P_{es}$ of the energy storage devices, the power consumption $P_y$ of the controllable loads, and the energy exchange capacity $P_{ex}$, with the external grid may all be active power.

The above-mentioned device state commissioning capacity X may represent different network structures composed of the devices in the micro-grid, and the above-mentioned scheduling capacity Y may represent operating parameters of all the devices in the micro-grid in the case of the structure represented by the device state commissioning capacity X. Thus, the control scheme for the micro-grid may be represented by the device state commissioning capacity X and the scheduling capacity Y. A specific value of each control capacity of the state commissioning capacity X and the scheduling capacity Y is variable to be solved.

$f(X)$ and $g(Y)$ may be different mathematical functions according to actual operating requirements and optimization objectives of different micro-grids. In this example, $f(X)$ may be the sum of the product of each element in X and its respective commissioning cost coefficient. $g(Y)$ may be the sum of the product of each element in Y and its respective scheduling cost coefficient.

$$f(X) = C_{gx}^T X_g(t) + C_{rx}^T X_r(t) + C_{esx}^T X_{es}(t)$$

$$= \sum_{i \in I} C_{gx}^i x_g(i, t) + \sum_{j \in J} C_{rx}^j x_r(j, t) + \sum_{k \in K} C_{esx}^k x_{es}(k, t),$$

-continued $$g(Y) = \sum_{i \in I} C_g^i P_g(i, t) + \sum_{j \in J} C_r^j P_r(j, t) + \sum_{k \in K} C_{es}^k P_{es}(k, t) + \sum_{d \in D} C_y^d P_y(d, t) + C_{ex} P_{ex}(t).$$

I represents a set of all main power generation equipment in the micro-grid, and i is an element in I. I may be expressed as I={1, 2, 3 . . . , i, . . . }. J represents a set of all backup power generation equipment in the micro-grid, and k is an element in J={1, 2, 3 . . . , j, . . . }. K represents a set of all energy storage devices in the micro-grid, and k is an element in K, i.e., K={1, 2, 3 . . . , k, . . . }. D represents a set of all controllable loads in the micro-grid, and d is an element in D. i.e., D={1, 2, 3 . . . , d, . . . }. L represents a set of all connected lines in the micro-grid, and l is an element in L, i.e. L={1, 2, 3 . . . , l, . . . }.

$C_{gx}$ represents a commissioning cost coefficient matrix of the main power generation equipment, and $C_{gx}^T$ is the transpose matrix of $C_{gx}$. $C_{rx}$ represents a commissioning cost coefficient matrix of the backup power generation equipment, and $C_{rx}^T$ is the transpose matrix of $C_{rx}$. $C_{esk}$ represents a commissioning cost coefficient matrix of the energy storage devices, and $C_{esx}^T$ the transpose matrix of $C_{esx}$. $C_{gx}^i$ is a start/stop commissioning cost coefficient of the main power generation equipment marked with i, $C_{rx}^j$ is a commissioning cost coefficient of the backup generation equipment marked with j, and $C_{esx}^k$ is a commissioning cost coefficient of the energy storage device marked with k.

$C_g$ represents a scheduling cost coefficient matrix of the main power generation equipment. $C_r$ represents a scheduling cost coefficient matrix of the backup power generation equipment. $C_{es}$ represents a scheduling cost coefficient matrix of the energy storage devices, $C_y$ represents a scheduling cost coefficient matrix of the controllable loads. $C_g^i$ represents a scheduling cost coefficient of the main power generation equipment marked with i, $C_r^j$ represents a scheduling cost coefficient of the backup power generation equipment marked with j, $C_{es}^k$ represents a scheduling cost coefficient of the energy storage device marked with k, $C_y^d$ represents a scheduling cost coefficient of the controllable load marked with d, and $C_{ex}$ represents a scheduling cost coefficient of energy exchange between the micro-grid and the external grid.

The step of determining the current control scheme using the optimization model may be performed at a computation time interval $\Delta T$. The computation is performed based on the optimization model once every $\Delta T$. A counting variable t takes 0 as an initial value and is accumulated by 1 each time. t is reset to 0 when the accumulated count reaches $\Gamma$, and then recounting is performed.

$x_g(i,t)$ represents an operating mode (start/stop, etc.) to be solved of the main power generation equipment marked with i in the $i^{th}$ computing period, $x_r(j,t)$ represents an operating mode (power generating mode and APF mode) to be solved of the backup power generation equipment marked with j in the $t^{th}$ computing period, and $x_{es}(k,t)$ represents an operating mode (charging/discharging, etc.) to be solved of the energy storage device marked with k in the $t^{th}$ computing period.

$P_g(i,t)$ represents the active power generating capacity to be solved of the main power generation equipment marked with i in the $t^{th}$ computing period, $P_r(j,t)$ represents the active power generating capacity to be solved of the backup power generation equipment marked with j in the $t^{th}$ computing period, $P_{es}(k,t)$ represents the active power charging/discharging capacity to be solved of the energy storage device marked with k in the $t^{th}$ computing period, $P_y(d,t)$ represents an active consumption to be solved of the controllable load marked with d in the $t^{th}$ computing period, and $P_{ex}(t)$ represents the active energy exchange capacity with the external grid to be solved in the $t^{th}$ computing period.

The minimum objective function ensures the minimum operating cost of the micro-grid.

For the micro-grid, there may be many corresponding constraint conditions. The micro-grid may meet these constraint conditions to ensure its normal operation. For example, there may be the following constraint conditions for an AC grid portion of the micro-grid shown in FIG. 3.

1. Constraint on a state value of the device state commissioning capacity X. The operating mode $x_g(i,t)$ of the main power generation equipment, the operating mode $x_r(j,t)$ of the backup power generation equipment and the operating mode $x_{es}(k,t)$ of the energy storage device meet the following constraint conditions:

$$x_g(i, t) = \begin{cases} 1, & \text{start} \\ 0, & \text{stop} \end{cases},$$

$$x_r(j, t) = \begin{cases} 1, & \text{power generating mode} \\ 0, & \text{APF mode} \end{cases},$$

$$x_{es}(k, t) = \begin{cases} 1, & \text{discharging} \\ 0, & \text{charging} \end{cases}.$$

2. Constraint on supply and demand balance of active power in the micro-grid. The overall active power generating capacity in the micro-grid and the active power exchange with the external grid should meet a supply and demand balance with the active power consumption of the loads.

$$\sum_{i \in I} P_g(i, t) + \sum_{j \in J} P_r(j, t) + \sum_{k \in K} P_{es}(k, t) + P_{ex}(t) = P_{load}(t) + \sum_{d \in D} P_y(d, t),$$

$P_{load}(t)$ is the total active power consumption of the uncontrollable loads in the $t^{th}$ computing period, and the value of $P_{load}(t)$ may be obtained by performing future-state prediction based on the current operating data, the previous operating data and the corresponding time stamp information.

3. Constraint on harmonic component and reactive component in the grid.

The backup power generation equipment is connected to network nodes in the micro-grid. These network nodes constitute a node set U, and u is an element in U={1, 2, 3 . . . , u, . . . }. The total number of nodes in U is μ, and μ=card(U). Therefore, an identifier set J of the backup power generation equipment may be expressed as J={$J_1, J_2, \ldots, J_u, \ldots, J_\mu$}), and the element $J_u$ in J represents a set of the backup power generation equipment accessed at the node u. The harmonic component and the reactive component in the micro-grid need to be controlled within a certain range at the specific node $$0 \leq \sum_{j \in J_u} [1 - x_r(j, t)] \cdot A_{APF,j} + A_u^h \leq A_u^{max}, \forall u \in U,$$

$$0 \leq \sum_{j \in J_u} [1 - x_r(j, t)] \cdot A_{APF,j} + A_u^Q \leq A_u^{max}, \forall u \in U,$$

$$0 \leq H_u + Q_u \leq \sum_{j \in J_u} [1 - x_r(j, t)] \cdot A_{APF,j} + A_u^h + A_u^Q + \varepsilon_u^h + \varepsilon_u^Q,$$

$$\forall u \in U.$$

$A_{APF,j}$ represents a rated compensation capacity of the backup power generation equipment j in the APF mode, and $A_u^h$ is the harmonic compensation capacity provided by other compensation manners at the node u. $A_u^Q$ is the reactive power compensation capacity provided by other compensation manners at the node u. $A_u^{max}$ is a maximum compensation capacity allowed at the node u. $\varepsilon_u^h$ is a slack variable in constraint on the harmonic component, and $\varepsilon_N^Q$ is a slack variable in constraint on the reactive component. $H_u$ is the harmonic component at the node u, and $Q_N$ is the reactive component at the node u. Both of $H_u$ and $Q_u$ may be obtained by performing the future-state prediction based on the current operating data, the previous operating data, and the corresponding time stamp information. The positive and negative values of the slack constant variables $\varepsilon_u^h$ and $\varepsilon_u^Q$ may be set to be constants, or obtained by the state analysis based on the current operating data and the corresponding time stamp information.

4. Constraint on reconstruction count. The reconstruction counts $N_{g,i}$ and $N_{r,j}$ of the main power generation equipment i and the backup power generation equipment j within a certain time interval T may be limited in a certain range. The constant $N_{g,i}^{max}$ is the upper limit of reconstruction count of the main power generation equipment i, and the constant $N_{r,j}^{max}$ is the upper limit of the reconstruction count of the backup power generation equipment j.

$$0 \leq N_{g,i} \leq N_{g,i}^{max} \forall i \in I,$$

$$0 \leq N_{r,j} \leq N_{r,j}^{max} \forall j \in J.$$

5. Constraint on the charging/discharging count of the energy storage devices. The count $N_{es,k}$ of charging/discharging reconstruction of the energy storage device k within a certain time interval T may be limited in a certain range. The constant $N_{es,k}^{max}$ is the upper limit of the reconstruction count of the energy storage device k.

$$0 \leq N_{es,k} \leq N_{es,k}^{max} \forall k \in K.$$

6. Constraint on active energy exchange with the external grid, it is expected that the energy exchange between the micro-grid and the external grid is within a certain reasonable range. If the micro-grid is in a grid-connected operating state, the state variable $s_{ex}$ is represented by 1, and if the micro-grid is in an islanded operating state, $s_{ex}$ is represented by 0. The constant $P_{ex}^{min}$ is the lower limit of active energy exchange with the external grid, and the constant $P_{ex}^{max}$ is the upper limit of active energy exchange with the external grid.

$$P_{ex}^{min} s_{ex} \leq P_{ex}(t) \leq P_{ex}^{max} s_{ex}.$$

7. Constraint on active power generating capacity of the main power generation equipment. It is expected that active power generated by each of the main power generation equipment in the micro-grid is within a certain range. The constant $P_{g,i}^{min}$ is the lower limit of the active power generated by the main power generation equipment i, and the constant $P_{g,i}^{max}$ is the upper limit of the active power generated by the main power generation equipment i.

$$P_{g,i}^{min} x_g(i,t) \leq P_g(i,t) \leq P_{g,i}^{max} x_g(i,t), \forall i \in I.$$

8. Constraint on the active power generating capacity of the backup power generation equipment. It is expected that active power generated by the backup power generation equipment in the micro-grid is within a certain range. The constant $P_{r,j}^{min}$ is the lower limit of the active power generated by the backup power generation equipment j, and the constant $P_{r,j}^{max}$ is the upper limit of the active power generated by the backup power generation equipment.

$$P_{r,j}^{min} x_r(j,t) \leq P_r(j,t) \leq P_{r,j}^{max} x_r(j,t), \forall j \in J.$$

9. Constraint on available generation capacity of the backup power generation equipment per se in the $t^{th}$ period. $S_r(j,t)$ represents the available generation capacity of the backup power generation equipment j per se in the $t^{th}$ period. It is necessary for $S_r(j,t)$ to ensure that sufficient power output is provided for the backup unit at the time interval $\Delta T$ within $[t,t+1]$, i.e., $S_r(j,t) \geq \int_t^{t+1} P_r(j,t)dt$ and/or $S_r(j,t) \geq P_r(j,t) \cdot \Delta T$. $S_{r,j}^{min}$ represents the lower limit of the available generation capacity of the backup power generation equipment j per se, and $S_{r,j}^{max}$ is the upper limit of the available generation capacity of the backup power generation equipment j per se. The constant $\varepsilon_{r,j}$ is a slack variable in the constraint on the generation capacity of the backup power generation equipment j. The value of $S_r(j,t)$ may be obtained by performing the future-state prediction based on the current operating data, the previous operating data, and the corresponding time stamp information. The values of $S_{r,j}^{min}$ and $S_{r,j}^{max}$ may be set as constants or obtained by performing the future-state prediction based on the current operating data, the previous operating data, and the corresponding time stamp information. The positive and negative values of the slack constant variable $\varepsilon_{r,j}$ may be set to be constants, or obtained by performing the state analysis based on the current operating data and the corresponding time stamp information.

$$S_{r,j}^{min} x_r(j,t) \leq S_r(j,t) \leq S_{r,j}^{max} x_r(j,t), \forall j \in J,$$

$$P_r(j,t) \cdot \Delta T + \varepsilon_{r,j} \leq S_{r,j}^{min} x_r(j,t) \forall j \in J.$$

10. Constraint on the rate of change of the generating capacity of the main power generation equipment. It is expected that the rate of change of the generating capacity of the main power generation equipment in the micro-grid is limited within a certain range. The constant $\tau_{g,t}^{min}$ is the lower limit of the rate of change of the generating capacity of the main power generation equipment i, and the constant $\tau_{g,t}^{max}$ is the upper limit of the rate of change of the generating capacity of the main power generation equipment i. $\tau$ represents the rate of change of active power generated or absorbed by an electrical device within $\Delta T$.

$$\tau_{g,i}^{min} \leq P_g(i,t) - P_g(i,t-1) \leq \tau_{g,i}^{max}, \forall i \in I.$$

11. Constraint on the rate of change of the generating capacity of the backup power generation equipment. It is expected that the rate of change $\tau$ of the generating capacity of the backup power generation equipment in the micro-grid is limited within a certain range. The constant $\tau_{r,j}^{min}$ is the lower limit of the rate of change of the generating capacity of the backup power generation equipment and the constant $\tau_{r,j}^{max}$ is the upper limit of the rate of change of the generating capacity of the backup power generation equipment j.

$$\tau_{r,j}^{min} \leq P_r(j,t) - P_r(j,t-1) \leq \tau_{r,j}^{max}, \forall j \in J.$$

12. Constraint on the rate of change of the charging/discharging capacity of the energy storage devices. It is expected that the rate of change of the charging/discharging capacity of the energy storage devices in the micro-grid is limited within a certain range. $\tau_{es}^{min}(k,t)$ is the lower limit of the rate of change of the charging/discharging capacity of the energy storage device k in the $t^{th}$ computing period, and $\tau_{es}^{max}(k,t)$ is the upper limit of the rate of change of the charging/discharging capacity of the energy storage device k in the $t^{th}$ computing period. Set values $\tau_{es}^{min}(k,t)$ and $\tau_{es}^{max}(k,t)$ may be set to be constants or determined by a state prediction unit.

$$\tau_{es}^{min}(k,t) \leq P_{es}(k,t) - P_{es}(k,t-1) \leq \tau_{es}^{max}(k,t), \forall k \in K.$$

13. Constraint on the charging/discharging capacity of the energy storage devices. It is expected that the charging/discharging capacity $P_{es}(k,t)$ of the energy storage device k in the micro-grid is controlled within a certain range. The constant $\overline{P}_{es,k}^{min}$ is the lower limit of the discharging capacity of the energy storage device k, and the constant $\overline{P}_{es,k}^{max}$ is the upper limit of the discharging capacity of the energy storage device k. The constant $P_{es,k}^{max}$ is the lower limit of the charging capacity of the energy storage device k and the constant $P_{es,k}^{max}$ is the upper limit of the charging capacity of the energy storage device k.

$$P_{es}(k,t) \leq \overline{P}_{es,k}^{max} x_{es}(k,t) - P_{es,k}^{min}[1 - x_{es}(k,t)], \forall k \in K,$$

$$P_{es}(k,t) \leq \overline{P}_{es,k}^{min} x_{es}(k,t) - P_{es,k}^{max}[1 - x_{es}(k,t)], \forall k \in K.$$

14. Constraint on the charging/discharging state of the energy storage devices. Taking $\Delta T$ as the computing time interval within $[t,t+1]$, the total charging/discharging capacity of the energy storage device is $\eta_k \int_t^{t+1} P_{es}(k,t)dt$ and/or $\eta_k \cdot P_{es}(k,t) \cdot \Delta T$. The constant represents the charging/discharging efficiency of the energy storage device k, and the constant $\eta_k$, represents the rated capacity of the energy storage device k. SOC(k,t) represents the charging/discharging degree of the energy storage device k in the $t^{th}$ computing period. The constant $SOC_k^{min}$ is the lower limit of the charging/discharging state of the energy storage device k, and the constant $P_{es,k}^{max}$ is the upper limit of the charging/discharging state of the energy storage device k.

$$SOC(k,t) = SOC(k,t-1) - \eta_k \frac{P_{es}(k,t) \cdot \Delta T}{Cap_k}, \forall k \in K,$$

$$SOC_k^{min} \leq SOC(k,t) \leq SOC_k^{max}, \forall k \in K.$$

15. Constraint on the total reserve capacity in the micro-grid. To deal with an emergency in the micro-grid system, it is expected that the main power generation equipment has a certain reserve capacity. Cap represents the rated capacity of the electrical device, $Cap_g(i,t)$ is the rated capacity of the main power generation equipment and $Cap_{es,k}$ is the rated capacity of the energy storage device k. $\rho$ represents a capacity coefficient of the electrical device, the constant $\rho_{g,i}$ is a reserve capacity coefficient of the main power generation equipment i, and the constant $\rho_{es,k}$ is the reserve capacity coefficient of the energy storage device k.

$$\sum_{i \in I} \rho_{g,i} Cap_g(i,t) \cdot x_g(i,t) + \sum_{k \in K} \rho_{es,k} SOC(k,t) \cdot Cap_{es,k} \geq$$

$$P_{load}(t) + \sum_{d \in D} P_y(d,t).$$

16. Constraint on power angle. The transmission power and the power angle difference $\theta_l$ of each line should be within a certain range.

$$\theta_l^{min} \leq \theta_l \leq \theta_l^{max}, \forall l \in L.$$

17. Constraint on power consumption of the controllable loads. It is expected that the scheduling capacity of the controllable loads is limited within a certain range. If a scheduling function of a controllable load is activated, the state variable $s_d$ is set to be 1, otherwise it is set to be 0. The value of $s_d$ may be determined by analyzing the operating state of the micro-grid based on the operating data and the corresponding time stamp information that are stored in the database. The constant $P_{y,d}^{min}$ is the lower limit of schedulable active power of the controllable load d when the scheduling function thereof is activated; and the constant $P_{y,d}^{max}$ is the upper limit of schedulable active power of the controllable load d when the scheduling function thereof is activated. The constant $Q_{y,d}^{min}$ is the lower limit of schedulable reactive power of the controllable load d when the scheduling function thereof is activated, and the constant $Q_{y,d}^{max}$ is the upper limit of schedulable reactive power of the controllable load d when the scheduling function thereof is activated. The constant $\tilde{P}_{y,d}^{min}$ is the lower limit of schedulable active power of the controllable load d when the scheduling function thereof is not activated; and the constant $\tilde{P}_{y,d}^{max}$ is the upper limit of schedulable active power of the controllable load d when the scheduling function thereof is not activated. The constant $\tilde{Q}_{y,d}^{min}$ is the lower limit of schedulable reactive power of the controllable load d when the scheduling function thereof is not activated, and the constant $\tilde{Q}_{y,d}^{max}$ is the upper limit of the schedulable reactive power of the controllable load d when the scheduling function thereof is not activated.

$$P_{y,d}^{min}s_d+\tilde{P}_{y,d}^{min}(1-s_d)\leq P_y(d,t)\leq P_{y,d}^{max}s_d+\tilde{P}_{y,d}^{max}(1-s_d), \forall d\in D,$$

$$Q_{y,d}^{min}s_d+\tilde{Q}_{y,d}^{min}(1-s_d)\leq Q_y(d,t)\leq Q_{y,d}^{max}s_d+\tilde{Q}_{y,d}^{max}(1-s_d), \forall d\in D.$$

Based on the above description, those of ordinary skill in the art can understand the specific meaning of the constraint conditions. The above constraint conditions are merely examples but not intended constitute a limitation to the technical solutions of the present invention. For example, the constraint conditions may not include the constraint on the reconstruction count.

The above-mentioned step that the current control scheme for the micro-grid is determined based on the constraint conditions of the micro-grid by minimizing the objective function of a total system operating cost may be implemented by using any suitable optimization model, such as, but not limited to, a Mixed Integer Optimization (MIO) algorithm model.

Alternatively, the current control scheme for the micro-grid may be determined based on the current analysis result by using an artificial intelligence model. The artificial intelligence model may be for example an ANN model combined with a tree search model. The artificial intelligence model may be obtained by training with a large amount of data. The tree search model establishes a target searching structure. The ANN comprehensively evaluates a searched target and then searches to get a final target. The artificial intelligence model has a learning capability. By training with a large amount of data, the artificial intelligence model may determine a currently appropriate control scheme for the micro-grid based on the current analysis result. Acquiring an optimal control scheme using the artificial intelligence model may effectively utilize the computing power of the system and significantly improve the quality of the control scheme.

As stated above, the analysis result and the control scheme for the micro-grid and their corresponding time stamp information may be stored in the database. The artificial intelligence model may be trained based on the time stamp information, previous analysis results and previous control schemes which are previously stored in the database.

In one example, first, the operating state analysis result of the micro-grid is input into the artificial intelligence model and another optimization and decision-making model (such as the aforementioned MIO algorithm model) that can determine the control scheme based on the state analysis result, to obtain the control schemes determined by the two models separately. Then, the two obtained control schemes are compared. Parameters of the artificial intelligence model are adjusted according to an offset distance between the two control schemes. Optionally, only when the offset distance between the two control schemes is more or less than a certain threshold, the parameters of the artificial intelligence model are adjusted.

The above training method may be implemented during operation of the micro-grid, effectively utilizing the operating data of the micro-grid. Besides, the obtained artificial intelligence model is more suitable for the micro-grid and further improves the quality of the control scheme determined by the artificial intelligence model.

As mentioned above, the micro-grid may include power generation equipment, an power electronic converter, a controllable load and/or a protection device. Certainly, the micro-grid may also include other electrical devices such as an energy storage device, a transformer and so on. As mentioned above, the micro-grid may be an AC/DC hybrid grid. Referring to FIG. 3 again, in the AC/DC hybrid grid, the power electronic converters are connected to an AC network and a DC network in the micro-grid to realize bidirectional energy flow. The power electronic converter may include a bidirectional DC/DC converter and a bidirectional DC/AC converter.

Optionally, the above-mentioned step S240 of determining the current control scheme for the micro-grid according to the current analysis result and reconstructing the micro-grid according to the current control scheme includes at least one of the following steps.

Operating states and operating parameters of the power generation equipment, the power electronic converter and/or the controllable load in the micro-grid are determined according to the current analysis result, and the power generation equipment, the power electronic converter and/or the controllable load are controlled to correspondingly change their operating states and/or operating parameters according to the operating states and the operating parameters thereof. For example, if it is determined according to the current analysis result that an operating state of a certain power electronic converter in the micro-grid should be changed from a generating mode to an APF mode, a corresponding control operation may be performed on the power electronic converter.

A switching state of the protection device is determined according to the operating states and the operating parameters of the power generation equipment, the power electronic converter and/or the controllable load, and the protection device is controlled to perform a corresponding switching operation according to the switching state of the protection device so as to change a topological structure of the micro-grid.

Figure 5:
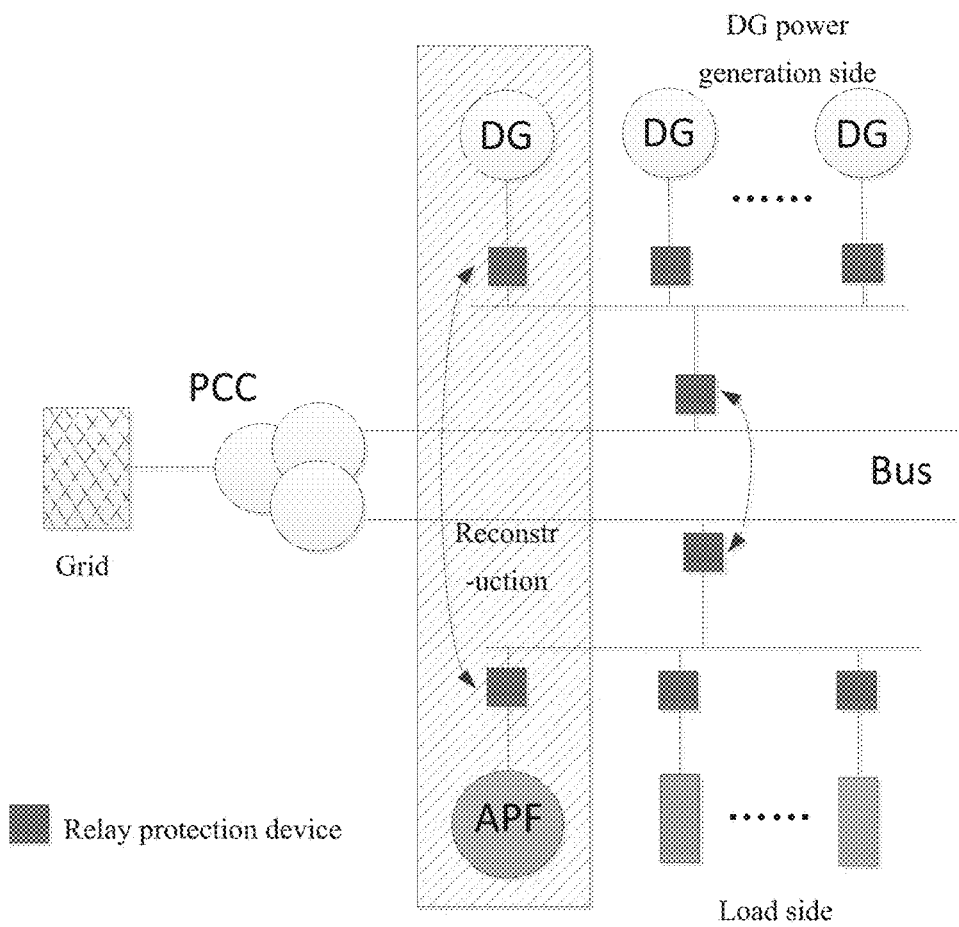
FIG. 5 illustrates a partial schematic diagram of a micro-grid in accordance with one embodiment of the present invention.

FIG. 5 illustrates a partial schematic diagram of a micro-grid in accordance with one embodiment of the present invention. FIG. 5 shows a power generation side at the top and a load side at the bottom DG represents that an power electronic converter works in a power generating, mode, APF represents that the power electronic converter works in an active power filtering mode. The dark rectangle represents a relay protection device, which may be in different switching states. When the relay protection device is in one state (for example, open), the power electronic converter in the shaded rectangular box is in the power generating mode. When the relay protection device is in another state (for example, closed), the power electronic converter is in the active power filtering mode. Thus, by changing the switching state of the relay protection device, the topological structure of the micro-grid shown in FIG. 5 is changed.

Figure 6:
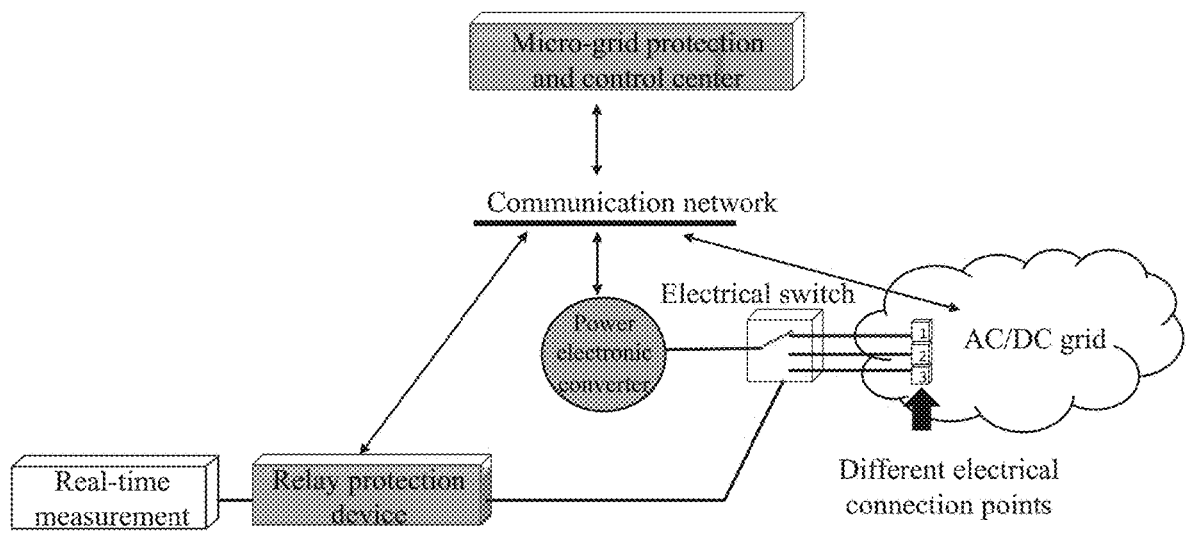
FIG. 6 illustrates a partial schematic diagram of a micro-grid in accordance with another embodiment of the present invention.

FIG. 6 illustrates a partial schematic diagram of a micro-grid in accordance with another embodiment of the present invention. In FIG. 6, an power electronic converter is connected to an AC/DC grid via an electrical switch controlled by a relay protection device. The electrical switch may be a single-pole multi-throw switch or other devices, which may adjust a switching state to change an operating state of the micro-grid. It can be understood that when the micro-grid protection and control center controls, through the relay protection device, the electrical switch to be connected with different lines, the power electronic converter is connected to different electrical connection points in the AC/DC grid. Thus, the topological structure of the micro-grid is also changed.

In the above embodiments of the present invention, the power electronic converter may flexibly work in the power generating mode, the APF mode and the shutdown mode. The power electronic converter may be used as backup power generation equipment in the micro-grid to be adjusted according to operating requirements, and it may also be used as a supplement to traditional power generation equipment serving as main power generation equipment to jointly support operation of the micro-grid. Thus, the micro-grid is operated more flexibly, intelligently and automatically.

Figure 7:
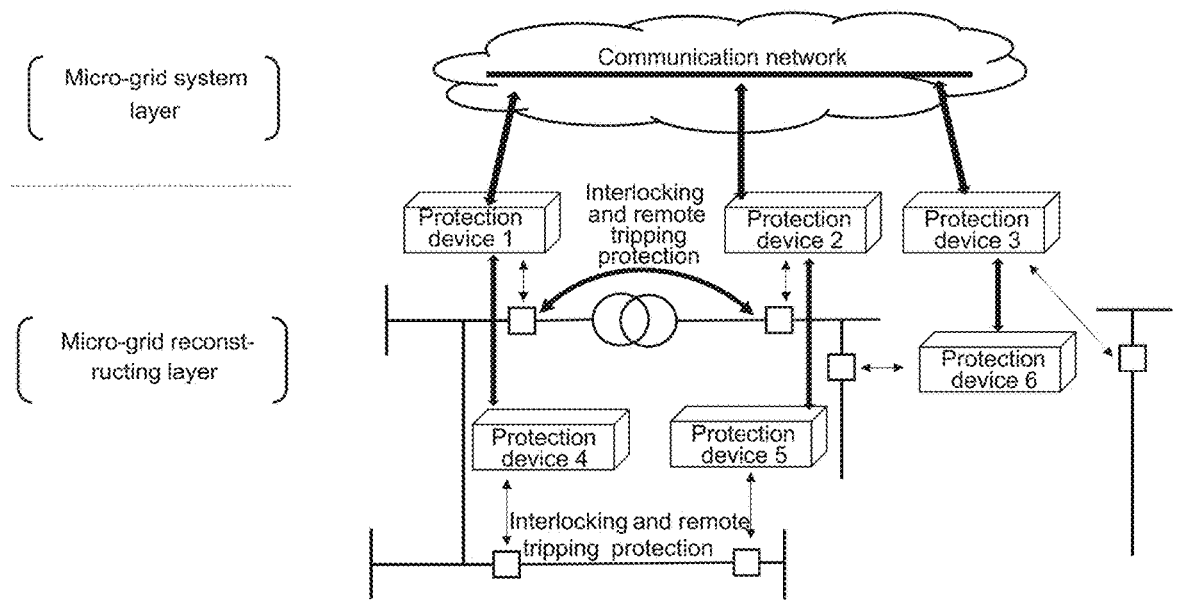
FIG. 7 illustrates a partial schematic diagram of a micro-grid in accordance with yet another embodiment of the present invention.

FIG. 7 illustrates a partial schematic diagram of a micro-grid in accordance with yet another embodiment of the present invention. There are a protection devices provided between primary/secondary devices of the micro-grid and a communication network of the micro-grid. Correspondingly, as shown in Table 2 below, switching states of the protection devices may be stored in a relevant data table in a database. In Table 2, state 1 indicates that the breaker of the protection device is closed, and state 0 indicates that the breaker of the protection device is open.

TABLE 2

| State of Protection device's Breaker | | | | |
|---|---|---|---|---|
| Protection device 1 | Protection device 2 | Protection device 3 | ... | Protection device n |
| State 0 | 1 | 1 | ... | 0 |

It can be understood that the protection devices shown in FIG. 7 may have protection functions of interlocking and remote tripping to react to and isolate a fault in the micro-grid faster.

Figure 8:
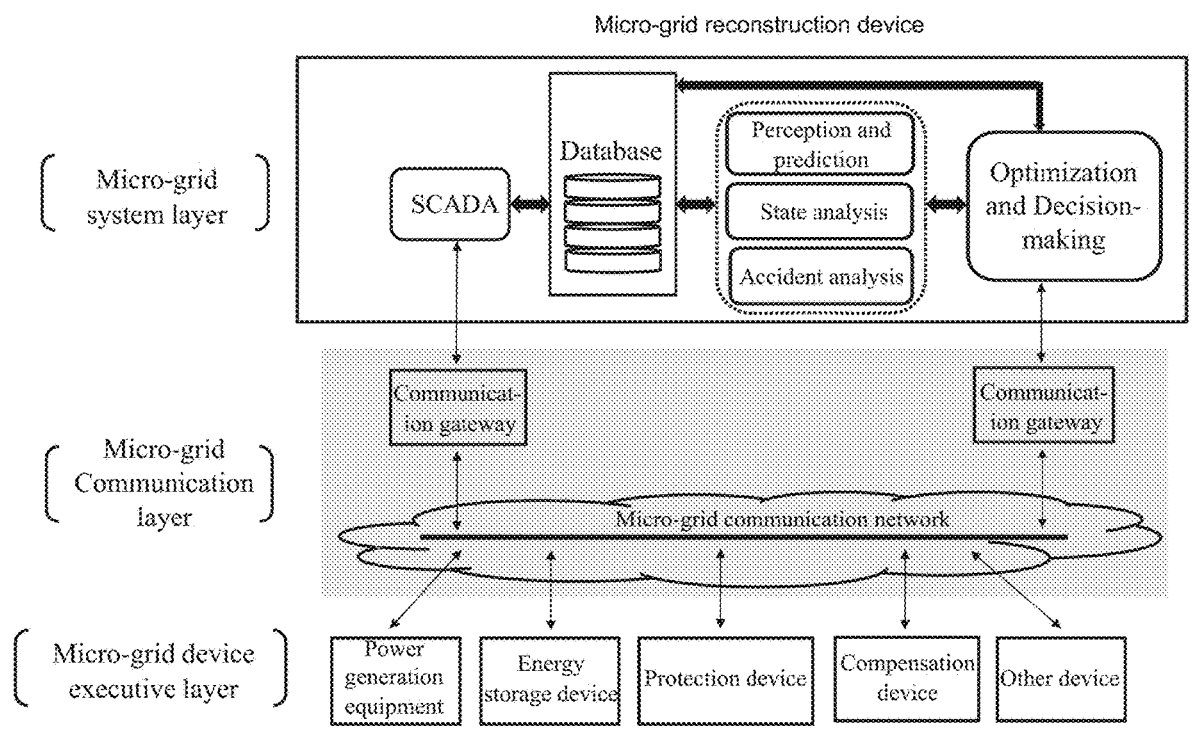
FIG. 8 illustrates a schematic diagram of a micro-grid reconstruction device in accordance with one embodiment of the present invention.

According to another aspect of the present invention, a micro-grid reconstruction device is provided. FIG. 8 illustrates a schematic diagram of a micro-grid reconstruction device in accordance with one embodiment of the present invention. As shown in FIG. 8, the micro-grid reconstruction device communicates with electrical devices in the micro-grid such as power generation equipment, an energy storage device, and a protection device via a communication network. The micro-grid reconstruction device may be connected to the various electrical devices by a communication gateway by multiple communication manners including optical fibers and wireless, etc. The micro-grid reconstruction device includes a data acquisition unit, a state analysis unit and an optimization and decision-making unit.

The data acquisition unit is shown as "SCADA" in FIG. 8, and is configured to monitor and acquire current operating data of a micro-grid in real-time, and to store the acquired current operating data and corresponding time stamp information in a database. In other words, the data acquisition unit is configured to perform steps S210 and S220 in the micro-grid reconstruction method 200, and may also be configured to perform steps S410 S420 in the micro-grid reconstruction method 400. By monitoring electrical devices in the micro-grid in real-time, operating data of the devices relevant to such as operating state and system power flow are acquired and processed. Thus, the operating data, such as switching action quantity and analog and digital quantities of the electrical devices in the micro-grid, is monitored in real-time.

The state analysis unit is configured to analyze an operating state of the micro-grid based on the operating data and the corresponding time stamp information that are stored in the database. That is, the state analysis unit is configured to perform step S230 in the micro-grid reconstruction method 200. The state analysis unit may also be configured to perform steps S431 to S435 and step S451 in the micro-grid reconstruction method 400.

Specifically, the state analysis unit may further include a perception and prediction module, a state analysis module, and an accident analysis module. The perception and prediction module is configured to perform step S433 in the micro-grid reconstruction method 400. The state analysis module and the accident analysis module are configured to perform step S435 in the micro-grid reconstruction method 400.

The optimization and decision-making unit is configured to determine a current control scheme for the micro-grid according to a current analysis result, and to reconstruct the micro-grid according to the current control scheme. That is, the optimization and decision-making unit is configured to perform step S240 in the micro-grid reconstruction method 200. The optimization and decision-making unit may also be configured to perform steps S441 to S443 in the micro-grid reconstruction method 400.

Those of ordinary skill in the art can understand the structure, implementation, and advantages of the micro-grid reconstruction device by reading the detailed description about the micro-grid reconstruction methods, which thus will not be described in detail herein.

Figure 9:
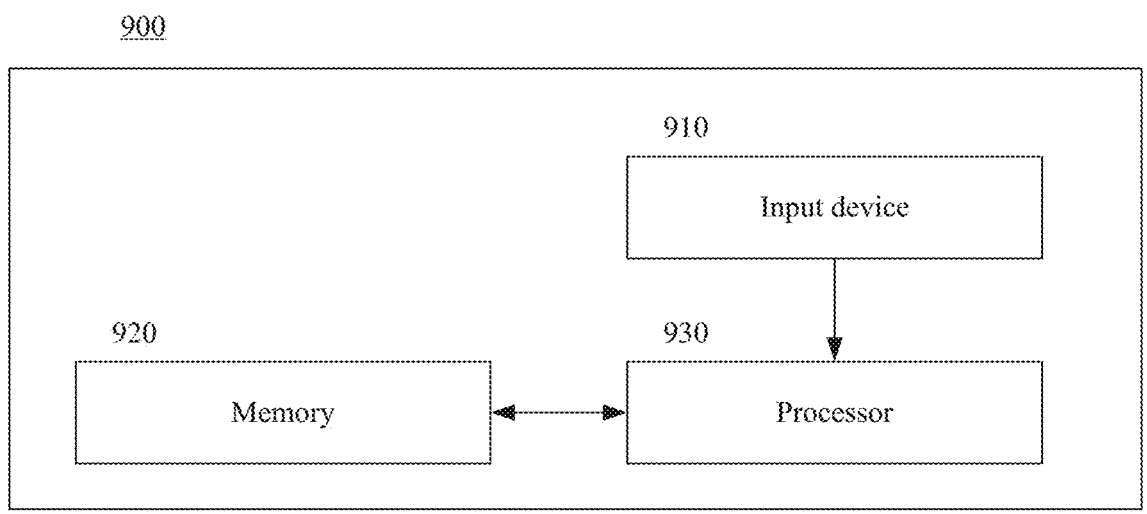
FIG. 9 illustrates a schematic block diagram of a micro-grid protection and control center in accordance with one embodiment of the present invention.

FIG. 9 illustrates a schematic block diagram of a micro-grid protection and control center 900 in accordance with one embodiment of the present invention. The micro-grid protection and control center 900 includes an input device 910, a storage device (i.e., a memory) 920, and a processor 930.

The input device 910 is configured to receive a user instruction, etc.

The storage device 920 is configured to store a computer program instruction for performing the corresponding steps in the micro-grid reconstruction methods according to the embodiments of the present invention.

The processor 930 is configured to run the computer program instruction stored in the storage device 920 so as to perform the corresponding steps in the micro-grid reconstruction methods in accordance with the embodiments of the present invention.

In one embodiment, the computer program instruction, when executed by the processor 930, is intended to perform the following steps: monitoring and acquiring current operating data of a micro-grid in real-time; storing the acquired current operating data and corresponding time stamp information in a database, analyzing an operating state of the micro-grid based on the operating data and the corresponding time stamp information that are stored in the database, and determining a current control scheme for the micro-grid according to a current analysis result, and reconstructing the micro-grid according to the current control scheme.

In addition, an embodiment of the present invention also provides a storage medium in which a program instruction is stored, and the program instruction, when executed by a computer or a processor, is used to perform the corresponding steps of the micro-grid reconstruction methods of the embodiments of the present invention, and is also used to realize the corresponding units or modules in the micro-grid reconstruction devices according to the embodiments of the present invention. The storage medium may include, for example, a storage component of a tablet computer, a hard disk of a personal computer, a read only memory (ROM), an erasable programmable read only memory (EPROM), a portable compact disk read only memory (CD-ROM), a USB memory, or any combination of the above storage media.

In one embodiment, the program instruction, when executed by a computer or a processor, is intended to enable the computer or the processor to realize all the units or modules of the micro-grid reconstruction devices in accordance with the present embodiments, and may perform the micro-grid reconstruction methods in accordance with the embodiments of the present invention.

In one embodiment, the program instruction, when executed, is used to perform the following steps: monitoring and acquiring current operating data of a micro rid in real-time; storing the acquired current operating data and corresponding time stamp information in a database; analyzing an operating state of the micro-grid based on the operating data and the corresponding time stamp information that are stored in the database; and determining a current control scheme for the micro-grid according to a current analysis result, and reconstructing the micro-grid according to the current control scheme.

Although exemplary embodiments have already described with reference to the accompanying drawings here, it should be understood that the above embodiments are merely exemplary and are not intended to limit the scope of the present invention to this. Persons of ordinary skill in the art can make various changes and modifications without departing from the spirit and scope of the present invention. All these changes and modifications are intended to be included within the scope of the present invention defined by the appended claims.

In several embodiments provided by the present application, it should be understood that the disclosed devices and methods may be implemented by other manners. For example, the device embodiments described above are merely schematic. For example, the partitioning of the units is a logical functional partitioning. There may be other partitioning manners during actual implementation. For example, multiple units or components may be combined or integrated into another device, or some features may be ignored or not performed. For example, the bidirectional power electronic converter is only functionally illustrative. In actual implementation, multiple power electronic converters may be combined to realize a certain function.

Numerous specific details are set forth in the description provided herein. However, it can be understood that the embodiments of the present invention may be practiced without these specific details. In some examples, well-known methods, structures and techniques have not been shown in detail in order not to obscure an understanding of this description.

Similarly, it should be understood that various features of the present invention are sometimes grouped together in a single embodiment, figure, or description thereof for the purpose of streamlining the present invention and aiding in the understanding of one or more of the various inventive aspects. The method of the present invention, however, should not to be interpreted as reflecting an intention that the claimed present invention requires more features than those expressly defined in each claim. Rather, as the corresponding claims reflect, inventive aspects lie in that the corresponding technical problems can be solved with the features less than all features of a certain single disclosed embodiment. Thus, the claims following the detailed description are hereby expressly incorporated into this detailed description, with each claim standing on its own as a separate embodiment of the present invention.

It will be understood by those skilled in the art that all of the features disclosed in this description (including the appended claims, abstract and accompanying drawings) and all of the processes or units of any method or device disclosed in such a way may be combined in any combination, except combinations where features are mutually exclusive. Each feature disclosed in this description (including the appended claims, abstract and accompanying drawings) may be replaced by alternative features serving the same, equivalent or similar purpose, unless expressly stated otherwise.

In addition, it may be understood by those skilled in the art that while some embodiments described herein include some but not other features included in other embodiments, combinations of features of different embodiments are meant to be within the scope of the present invention, and form different embodiments. For example, in the claims, any of the claimed embodiments can be used in any combination manner.

The above description is merely a specific implementation manner of the present invention or is illustrative of the specific implementation manner of the present invention, but the scope of protection of the present invention is not limited to this. Any changes or replacements that would be readily conceived by any person skilled in the art within the technical scope disclosed in the present invention should be within the scope of protection of the present invention. The scope of protection of the present invention shall be subject to the scope of protection defined by the claims.

What is claimed is:

1. A method of operating electrical devices to reconstruct a micro-grid, the method including:
   acquiring operating data of the micro-grid in real-time;
   storing the operating data and corresponding time stamp information in a database, wherein the operating data includes current operating data and previous operating data;
   analyzing an operating state of the micro-grid based on the operating data and the corresponding time stamp information that are stored in the database, wherein said analyzing includes:

determining that the micro-grid is in abnormal state based on current operating data;
after determining that the micro-grid is in abnormal state:
retrieving operating data of electrical devices selected based on their position relative to a location of an abnormal event from the current operating data and previous operating data;
performing accident analysis based on the retrieved operating data and the corresponding time stamp information; and
after the accident analysis result indicates that there is a true fault in the micro-grid, determining a current control scheme according to an accident analysis result; and
determining that the micro-grid is in normal state;
after determining that the micro-grid is in normal state:
performing current-state analysis and future-state prediction based on the current operating data, previous operating data, and the corresponding time stamp information; and
determining a current control scheme according to a current-state analysis result and a future-state prediction result; and
operating the electrical devices according to the respective current control scheme to reconstruct the micro-grid.

2. The method according to claim 1, wherein:
the determining the current control scheme according to the accident analysis result includes:
determining a first optimization model according to the accident analysis result; and
determining the current control scheme based on the accident analysis result by using the first optimization model;
the determining the current control scheme according to the current-state analysis result and the future-state prediction result includes:
determining a second optimization model according to the current-state analysis result and the future-state prediction result; and
determining the current control scheme based on the current-state analysis result and the future-state prediction result by using the second optimization model.

3. The method according to claim 1, further including:
if the accident analysis result indicates that there is no true fault in the micro-grid, determining whether a protection device in the micro-grid performs a mis-operation; and
if the protection device in the micro-grid performs the mis-operation, controlling a breaker of the protection device to be closed.

4. The method according to claim 1, further including:
sending warning information if the accident analysis result indicates that there is a true fault in the micro-grid.

5. The method according to claim 1, wherein:
the micro-grid includes power generation equipment, a power electronic converter(s), a controllable load(s) and/or a protection device(s), and
the determining the current control scheme for the micro-grid according to the current-state analysis result and the operating the electrical devices according to the respective current control scheme to reconstruct the micro-grid include:
determining operating states and operating parameters of the power generation equipment, the power electronic converter(s) and/or the controllable load(s) according to the current-state analysis result, and controlling the power generation equipment, the power electronic converter(s) and/or the controllable load(s) to correspondingly change their operating states and/or the operating parameters according to the operating states and/or the operating parameters of the power generation equipment, the power electronic converter(s) and/or the controllable load(s); and/or
determining a switching state of the protection device(s) according to the operating states and the operating parameters of the power generation equipment, the power electronic converter(s) and/or the controllable load(s), and controlling the protection device(s) to perform a corresponding switching operation(s) according to the switching state of the protection device(s) so as to change a topological structure of the micro-grid.

6. The method according to claim 5, wherein the determining the switching state of the protection device(s) according to the operating states and the operating parameters of the power generation equipment, the power electronic converter(s) and/or the controllable load(s) includes:
retrieving a state decision table of the protection device(s) of the micro-grid based on the operating states and the operating parameters of the power generation equipment, the power electronic converter(s) and/or the controllable load(s); and
determining the switching state of the protection device(s) according to the retrieved result.

7. The method according to claim 1, wherein the determining the current control scheme for the micro-grid according to the current-state analysis result includes:
determining the current control scheme for the micro-grid based on constraint conditions of the micro-grid by minimizing an objective function of a total system operating cost of the micro-grid, wherein the total system operating cost is equal to a sum of a system commissioning cost and a system scheduling cost that are computed according to the current-state analysis result.

8. The method according to claim 1, wherein the determining the current control scheme for the micro-grid according to the current-state analysis result includes:
determining the current control scheme for the micro-grid according to the current-state analysis result by using an artificial intelligence model.

9. The method according to claim 8, further including:
storing the current-state analysis result and corresponding time stamp information in the database;
storing the current control scheme and corresponding time stamp information in the database; and
training the artificial intelligence model based on the time stamp information, a previous analysis result and a previous control scheme that are stored in the database.

10. A micro-grid protection and control center, including a processor and a memory, wherein the memory stores a computer program instruction, and the computer program instruction, when executed by the processor, is used to perform:
  acquiring operating data of a micro-grid in real-time;
  storing the operating data and corresponding time stamp information in a database, wherein the operating data includes current operating data and previous operating data;
  analyzing an operating state of the micro-grid based on the operating data and the corresponding time stamp information that are stored in the database, wherein said analyzing includes:
    computing a determination of whether the micro-grid is in abnormal state or normal state based on current operating data;
    based on the computed determination indicating that the micro-grid is in abnormal state:
      retrieving operating data of electrical devices selected based on their position relative to a location of an abnormal event from the current operating data and previous operating data;
      performing accident analysis based on the retrieved operating data and the corresponding time stamp information; and
      determining a current control scheme according to an accident analysis result if the accident analysis result indicates that there is a true fault in the micro-grid; and
    based on the computed determination indicating that the micro-grid is in normal state:
      performing current-state analysis and future-state prediction based on the current operating data, previous operating data, and the corresponding time stamp information; and
      determining a current control scheme according to a current-state analysis result and a future-state prediction result; and
  operating the electrical devices according to the respective current control scheme to reconstruct the micro-grid.

11. At least one non-transitory computer-readable storage medium storing processor-executable instructions that, when executed by at least one computer hardware processor, cause the at least one computer hardware processor to perform:
  acquiring operating data of a micro-grid in real-time;
  storing the operating data and corresponding time stamp information in a database, wherein the operating data includes current operating data and previous operating data;
  analyzing an operating state of the micro-grid based on the operating data and the corresponding time stamp information that are stored in the database, wherein said analyzing includes:
    computing a determination of whether the micro-grid is in abnormal state or normal state based on current operating data;
    based on the computed determination indicating that the micro-grid is in abnormal state:
      retrieving operating data of electrical devices selected based on their position relative to a location of an abnormal event from the current operating data and previous operating data;
      performing accident analysis based on the retrieved operating data and the corresponding time stamp information; and
      determining a current control scheme according to an accident analysis result if the accident analysis result indicates that there is a true fault in the micro-grid; and
    based on the computed determination indicating that the micro-grid is in normal state:
      performing current-state analysis and future-state prediction based on the current operating data, previous operating data, and the corresponding time stamp information; and
      determining a current control scheme according to a current-state analysis result and a future-state prediction result; and
  operating the electrical devices according to the respective current control scheme to reconstruct the micro-grid.

12. The at least one non-transitory computer-readable storage medium of claim 11, wherein:
  the determining the current control scheme according to the accident analysis result includes:
    determining a first optimization model according to the accident analysis result; and
    determining the current control scheme based on the accident analysis result by using the first optimization model;
  the determining the current control scheme according to the current-state analysis result and the future-state prediction result includes:
    determining a second optimization model according to the current-state analysis result and the future-state prediction result; and
    determining the current control scheme based on the current-state analysis result and the future-state prediction result by using the second optimization model.

13. The at least one non-transitory computer-readable storage medium of claim 11, wherein the processor-executable instructions, when executed by at least one computer hardware processor, further cause the at least one computer hardware processor to perform:
  if the accident analysis result indicates that there is no true fault in the micro-grid, determining whether a protection device in the micro-grid performs a mis-operation; and
  if the protection device in the micro-grid performs the mis-operation, controlling a breaker of the protection device to be closed.

14. The at least one non-transitory computer-readable storage medium of claim 11, wherein the processor-executable instructions, when executed by at least one computer hardware processor, further cause the at least one computer hardware processor to perform:
  sending warning information if the accident analysis result indicates that there is a true fault in the micro-grid.

15. The at least one non-transitory computer-readable storage medium of claim 11, wherein:
  the processor-executable instructions are configured to operate in connection with a micro- grid including power generation equipment, a power electronic converter(s), a controllable load(s) and/or a protection device(s), and
  the determining the current control scheme for the micro-grid according to the current-state analysis result and the reconstructing the micro-grid according to the current control scheme include:

determining operating states and operating parameters of the power generation equipment, the power electronic converter(s) and/or the controllable load(s) according to the current-state analysis result, and controlling the power generation equipment, the power electronic converter(s) and/or the controllable load(s) to correspondingly change their operating states and/or the operating parameters according to the operating states and/or the operating parameters of the power generation equipment, the power electronic converter(s) and/or the controllable load(s); and/or determining a switching state of the protection device(s) according to the operating states and the operating parameters of the power generation equipment, the power electronic converter(s) and/or the controllable load(s), and controlling the protection device(s) to perform a corresponding switching operation(s) according to the switching state of the protection device(s) so as to change a topological structure of the micro-grid.

16. The at least one non-transitory computer-readable storage medium of claim 15, wherein:
the determining the switching state of the protection device(s) according to the operating states and the operating parameters of the power generation equipment, the power electronic converter(s) and/or the controllable load(s) includes:

retrieving a state decision table of the protection device(s) of the micro-grid based on the operating states and the operating parameters of the power generation equipment, the power electronic converter(s) and/or the controllable load(s); and determining the switching state of the protection device(s) according to the retrieved result.

17. The at least one non-transitory computer-readable storage medium of claim 15, wherein:
the processor-executable instructions for determining the current control scheme for the micro-grid according to the current-state analysis result includes:
an artificial intelligence model.

18. The at least one non-transitory computer-readable storage medium of claim 11, wherein:
the determining the current control scheme for the micro-grid according to the current-state analysis result includes:
determining the current control scheme for the micro-grid based on constraint conditions of the micro-grid by minimizing an objective function of a total system operating cost of the micro-grid, wherein the total system operating cost is equal to a sum of a system commissioning cost and a system scheduling cost that are computed according to the current-state analysis result.

* * * * *